United States Patent
Jalan et al.

(10) Patent No.: US 10,341,427 B2
(45) Date of Patent: Jul. 2, 2019

(54) FORWARDING POLICIES ON A VIRTUAL SERVICE NETWORK

(71) Applicant: A10 Networks, Inc., San Jose, CA (US)

(72) Inventors: Rajkumar Jalan, Saratoga, CA (US); Gurudeep Kamat, San Jose, CA (US)

(73) Assignee: A10 Networks, Inc., San Jose, CA (US)

(*) Notice: Subject to any disclaimer, the term of this patent is extended or adjusted under 35 U.S.C. 154(b) by 324 days.

(21) Appl. No.: 15/394,669

(22) Filed: Dec. 29, 2016

(65) Prior Publication Data

US 2017/0111441 A1    Apr. 20, 2017

Related U.S. Application Data

(63) Continuation of application No. 15/048,290, filed on Feb. 19, 2016, now Pat. No. 9,544,364, which is a
(Continued)

(51) Int. Cl.
*H04L 29/06* (2006.01)
*H04L 29/08* (2006.01)
*H04L 12/741* (2013.01)

(52) U.S. Cl.
CPC .......... *H04L 67/1002* (2013.01); *H04L 45/74* (2013.01); *H04L 67/10* (2013.01);
(Continued)

(58) Field of Classification Search
CPC ..... H04L 67/1002; H04L 41/22; H04L 67/34; H04L 41/145; H04L 67/1029;
(Continued)

(56) References Cited

U.S. PATENT DOCUMENTS

| | | |
|---|---|---|
| 4,403,286 A | 9/1983 | Fry et al. |
| 4,495,570 A | 1/1985 | Kitajima et al. |

(Continued)

FOREIGN PATENT DOCUMENTS

| | | |
|---|---|---|
| CN | 1725702 A | 1/2006 |
| CN | 101094225 A | 12/2007 |

(Continued)

OTHER PUBLICATIONS

Cardellini, et al., "Dynamic Load Balancing on Web-Server Systems", IEEE Internet Computing, 1999, vol. 3(3), pp. 28-29.
(Continued)

*Primary Examiner* — Ninos Donabed
(74) *Attorney, Agent, or Firm* — Keith Kline; The Kline Law Firm PC

(57) ABSTRACT

In providing packet forwarding policies in a virtual service network that includes a network node and a pool of service load balancers serving a virtual service, the network node: receives a virtual service session request from a client device, the request including a virtual service network address for the virtual service; compares the virtual service network address in the request with the virtual service network address in each at least one packet forwarding policy; in response to finding a match between the virtual service network address in the request and a given virtual service network address in a given packet forwarding policy, determines the given destination in the given packet forwarding policy; and sends the request to a service load balancer in the pool of service load balancers associated with the given destination, where the service load balancer establishes a virtual service session with the client device.

18 Claims, 12 Drawing Sheets

Related U.S. Application Data continuation of application No. 13/706,363, filed on Dec. 6, 2012, now Pat. No. 9,338,225.

(52) U.S. Cl.
CPC .............. *H04L 67/12* (2013.01); *H04L 67/32* (2013.01); *H04L 67/42* (2013.01)

(58) Field of Classification Search
CPC . H04L 67/1097; H04L 29/06; H04L 67/1006; H04L 67/1014; H04L 67/1017; H04L 67/1031; H04L 12/4641; H04L 29/06612; H04L 29/12132; H04L 29/12783; H04L 41/0886; H04L 41/0893; H04L 41/12; H04L 41/5096; H04L 61/1552; H04L 61/35; H04L 63/0209; H04L 63/0218; H04L 63/0272; H04L 63/08; H04L 63/166; H04L 67/02; H04L 67/10; H04L 67/1008; H04L 67/1012; G06F 2209/462; G06F 9/465; G06F 9/5072; G06F 9/5077; G06F 17/30067; G06Q 10/06; G06Q 10/10

See application file for complete search history.

(56) References Cited

U.S. PATENT DOCUMENTS

| | | | |
|---|---|---|---|
| 4,577,272 | A | 3/1986 | Ballew et al. |
| 4,720,850 | A | 1/1988 | Oberlander et al. |
| 4,864,492 | A | 9/1989 | Blakely-Fogel et al. |
| 4,882,699 | A | 11/1989 | Evensen |
| 5,031,089 | A | 7/1991 | Liu et al. |
| 5,218,676 | A | 6/1993 | Ben-Ayed et al. |
| 5,293,488 | A | 3/1994 | Riley et al. |
| 5,341,477 | A | 8/1994 | Pitkin et al. |
| 5,432,908 | A | 7/1995 | Heddes et al. |
| 5,537,542 | A | 7/1996 | Eilert et al. |
| 5,563,878 | A | 10/1996 | Blakeley et al. |
| 5,603,029 | A | 2/1997 | Aman et al. |
| 5,675,739 | A | 10/1997 | Eilert et al. |
| 5,740,371 | A | 4/1998 | Wallis |
| 5,751,971 | A | 5/1998 | Dobbins et al. |
| 5,754,752 | A | 5/1998 | Sheh et al. |
| 5,774,660 | A | 6/1998 | Brendel et al. |
| 5,774,668 | A | 6/1998 | Choquier et al. |
| 5,796,936 | A | 8/1998 | Watabe et al. |
| 5,812,771 | A | 9/1998 | Fee et al. |
| 5,828,847 | A | 10/1998 | Gehr et al. |
| 5,835,724 | A | 11/1998 | Smith |
| 5,867,636 | A | 2/1999 | Walker |
| 5,867,661 | A | 2/1999 | Bittinger et al. |
| 5,875,296 | A | 2/1999 | Shi et al. |
| 5,917,997 | A | 6/1999 | Bell et al. |
| 5,918,017 | A | 6/1999 | Attanasio et al. |
| 5,923,854 | A | 7/1999 | Bell et al. |
| 5,931,914 | A | 8/1999 | Chiu |
| 5,935,207 | A | 8/1999 | Logue et al. |
| 5,935,215 | A | 8/1999 | Bell et al. |
| 5,941,988 | A | 8/1999 | Bhagwat et al. |
| 5,944,794 | A | 8/1999 | Okamoto et al. |
| 5,946,686 | A | 8/1999 | Schmuck et al. |
| 5,951,650 | A | 9/1999 | Bell et al. |
| 5,951,694 | A | 9/1999 | Choquier et al. |
| 6,006,264 | A | 12/1999 | Colby et al. |
| 6,006,269 | A | 12/1999 | Phaal |
| 6,031,978 | A | 2/2000 | Cotner et al. |
| 6,041,357 | A | 3/2000 | Kunzelman et al. |
| 6,076,108 | A | 6/2000 | Courts et al. |
| 6,088,728 | A | 7/2000 | Bellemore et al. |
| 6,098,093 | A | 8/2000 | Bayeh et al. |
| 6,104,717 | A | 8/2000 | Coile et al. |
| 6,119,174 | A | 9/2000 | Borowsky et al. |
| 6,128,279 | A | 10/2000 | O'Neil et al. |
| 6,141,759 | A | 10/2000 | Braddy |
| 6,185,598 | B1 | 2/2001 | Farber et al. |
| 6,223,205 | B1 | 4/2001 | Harchol-Balter et al. |
| 6,223,287 | B1 | 4/2001 | Douglas et al. |
| 6,247,057 | B1 | 6/2001 | Barrera, III |
| 6,249,820 | B1 | 6/2001 | Dobbins et al. |
| 6,252,878 | B1 | 6/2001 | Locklear, Jr. et al. |
| 6,262,976 | B1 | 7/2001 | McNamara |
| 6,286,039 | B1 | 9/2001 | Van Horne et al. |
| 6,314,463 | B1 | 11/2001 | Abbott et al. |
| 6,317,786 | B1 | 11/2001 | Yamane et al. |
| 6,324,177 | B1 | 11/2001 | Howes et al. |
| 6,330,560 | B1 | 12/2001 | Harrison et al. |
| 6,339,423 | B1 | 1/2002 | Sampson et al. |
| 6,353,614 | B1 | 3/2002 | Borella et al. |
| 6,363,075 | B1 | 3/2002 | Huang et al. |
| 6,363,081 | B1 | 3/2002 | Gase |
| 6,374,300 | B2 | 4/2002 | Masters |
| 6,374,359 | B1 | 4/2002 | Shrader et al. |
| 6,381,632 | B1 | 4/2002 | Lowell |
| 6,393,475 | B1 | 5/2002 | Leong et al. |
| 6,397,261 | B1 | 5/2002 | Eldridge et al. |
| 6,430,622 | B1 | 8/2002 | Aiken, Jr. et al. |
| 6,445,704 | B1 | 9/2002 | Howes et al. |
| 6,446,225 | B1 | 9/2002 | Robsman et al. |
| 6,490,682 | B2 | 12/2002 | Vanstone et al. |
| 6,496,866 | B2 | 12/2002 | Attanasio et al. |
| 6,510,464 | B1 | 1/2003 | Grantges, Jr. et al. |
| 6,515,988 | B1 | 2/2003 | Eldridge et al. |
| 6,542,926 | B2 | 4/2003 | Zalewski et al. |
| 6,564,215 | B1 | 5/2003 | Hsiao et al. |
| 6,567,857 | B1 | 5/2003 | Gupta et al. |
| 6,578,066 | B1 | 6/2003 | Logan et al. |
| 6,587,866 | B1 | 7/2003 | Modi et al. |
| 6,591,262 | B1 | 7/2003 | MacLellan et al. |
| 6,594,268 | B1 | 7/2003 | Aukia et al. |
| 6,598,167 | B2 | 7/2003 | Devine et al. |
| 6,606,315 | B1 | 8/2003 | Albert et al. |
| 6,609,150 | B2 | 8/2003 | Lee et al. |
| 6,611,498 | B1 | 8/2003 | Baker et al. |
| 6,650,641 | B1 | 11/2003 | Albert et al. |
| 6,657,974 | B1 | 12/2003 | Britton et al. |
| 6,697,354 | B1 | 2/2004 | Borella et al. |
| 6,701,377 | B2 | 3/2004 | Burmann et al. |
| 6,704,317 | B1 | 3/2004 | Dobson |
| 6,711,618 | B1 | 3/2004 | Danner et al. |
| 6,714,979 | B1 | 3/2004 | Brandt et al. |
| 6,718,383 | B1 | 4/2004 | Hebert |
| 6,742,126 | B1 | 5/2004 | Mann et al. |
| 6,745,229 | B1 | 6/2004 | Gobin et al. |
| 6,748,413 | B1 | 6/2004 | Bournas |
| 6,760,758 | B1 | 7/2004 | Lund et al. |
| 6,763,370 | B1 | 7/2004 | Schmeidler et al. |
| 6,763,468 | B2 | 7/2004 | Gupta et al. |
| 6,772,333 | B1 | 8/2004 | Brendel |
| 6,779,017 | B1 | 8/2004 | Lamberton et al. |
| 6,877,095 | B1 | 4/2005 | Allen |
| 6,886,044 | B1 | 4/2005 | Miles et al. |
| 6,892,307 | B1 | 5/2005 | Wood et al. |
| 6,941,384 | B1 | 9/2005 | Aiken, Jr. et al. |
| 6,952,728 | B1 | 10/2005 | Alles et al. |
| 6,954,784 | B2 | 10/2005 | Aiken, Jr. et al. |
| 6,963,917 | B1 | 11/2005 | Callis et al. |
| 6,965,930 | B1 | 11/2005 | Arrowood et al. |
| 6,996,617 | B1 | 2/2006 | Aiken, Jr. et al. |
| 6,996,631 | B1 | 2/2006 | Aiken, Jr. et al. |
| 7,058,600 | B1 | 6/2006 | Combar et al. |
| 7,058,789 | B2 | 6/2006 | Henderson et al. |
| 7,120,697 | B2 | 10/2006 | Aiken, Jr. et al. |
| 7,188,181 | B1 | 3/2007 | Squier et al. |
| 7,225,249 | B1 | 5/2007 | Barry et al. |
| 7,430,611 | B2 | 9/2008 | Aiken, Jr. et al. |
| 7,463,648 | B1 | 12/2008 | Eppstein et al. |
| 7,509,369 | B1 | 3/2009 | Tormasov |
| 7,586,871 | B2* | 9/2009 | Hamilton ............... H04W 76/20 370/328 |
| 7,703,102 | B1 | 4/2010 | Eppstein et al. |
| 7,792,113 | B1 | 9/2010 | Foschiano et al. |
| 7,948,952 | B2 | 5/2011 | Hurtta et al. |

(56) References Cited

U.S. PATENT DOCUMENTS

| | | |
|---|---|---|
| 7,970,934 B1 | 6/2011 | Patel |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,130,826 B2* | 3/2012 | Smith .................... H04L 41/00 375/240.02 |
| 8,179,809 B1 | 5/2012 | Eppstein et al. |
| 8,191,106 B2 | 5/2012 | Choyi et al. |
| 8,224,971 B1 | 7/2012 | Miller et al. |
| 8,234,650 B1 | 7/2012 | Eppstein et al. |
| 8,239,445 B1 | 8/2012 | Gage et al. |
| 8,255,644 B2 | 8/2012 | Sonnier et al. |
| 8,296,434 B1 | 10/2012 | Miller et al. |
| 8,312,507 B2 | 11/2012 | Chen et al. |
| 8,543,644 B2 | 9/2013 | Gage et al. |
| 8,584,199 B1 | 11/2013 | Chen et al. |
| 8,595,791 B1 | 11/2013 | Chen et al. |
| 8,694,993 B1* | 4/2014 | Dotan .................... H04L 67/42 709/203 |
| 8,813,180 B1 | 8/2014 | Chen et al. |
| 8,826,372 B1 | 9/2014 | Chen et al. |
| 8,885,463 B1 | 11/2014 | Medved et al. |
| 8,965,955 B2* | 2/2015 | Agarwal ................ H04L 69/16 709/203 |
| 9,118,618 B2 | 8/2015 | Davis |
| 9,118,620 B1 | 8/2015 | Davis |
| 9,219,751 B1 | 12/2015 | Chen et al. |
| 9,253,152 B1 | 2/2016 | Chen et al. |
| 9,270,705 B1 | 2/2016 | Chen et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,497,201 B2 | 11/2016 | Chen et al. |
| 9,544,364 B2 | 1/2017 | Jalan et al. |
| 2001/0015812 A1 | 8/2001 | Sugaya |
| 2002/0010783 A1 | 1/2002 | Primak et al. |
| 2002/0091831 A1 | 7/2002 | Johnson |
| 2002/0124089 A1 | 9/2002 | Aiken, Jr. et al. |
| 2002/0133491 A1 | 9/2002 | Sim et al. |
| 2002/0141448 A1 | 10/2002 | Matsunaga |
| 2002/0143953 A1 | 10/2002 | Aiken |
| 2002/0143954 A1 | 10/2002 | Aiken, Jr. et al. |
| 2002/0166080 A1 | 11/2002 | Attanasio et al. |
| 2002/0178265 A1 | 11/2002 | Aiken, Jr. et al. |
| 2002/0178268 A1 | 11/2002 | Aiken, Jr. et al. |
| 2002/0191575 A1 | 12/2002 | Kalavade et al. |
| 2002/0194335 A1 | 12/2002 | Maynard |
| 2002/0199000 A1 | 12/2002 | Banerjee |
| 2003/0023711 A1 | 1/2003 | Parmar et al. |
| 2003/0023873 A1 | 1/2003 | Ben-Itzhak |
| 2003/0031180 A1 | 2/2003 | Datta et al. |
| 2003/0035420 A1 | 2/2003 | Niu |
| 2003/0061402 A1 | 3/2003 | Yadav |
| 2003/0079146 A1 | 4/2003 | Burstein |
| 2003/0081624 A1 | 5/2003 | Aggarwal et al. |
| 2003/0108052 A1* | 6/2003 | Inoue ................ H04L 29/12377 370/399 |
| 2003/0131245 A1 | 7/2003 | Linderman |
| 2003/0152078 A1 | 8/2003 | Henderson et al. |
| 2003/0202536 A1 | 10/2003 | Foster et al. |
| 2004/0001497 A1 | 1/2004 | Sharma |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0210623 A1 | 10/2004 | Hydrie et al. |
| 2004/0210663 A1* | 10/2004 | Phillips ................ H04L 67/1008 709/230 |
| 2004/0250059 A1* | 12/2004 | Ramelson ........... H04L 63/0428 713/150 |
| 2004/0253956 A1 | 12/2004 | Collins |
| 2005/0009520 A1 | 1/2005 | Herrero et al. |
| 2005/0021949 A1 | 1/2005 | Izawa et al. |
| 2005/0125276 A1 | 6/2005 | Rusu |
| 2005/0141506 A1 | 6/2005 | Aiken, Jr. et al. |
| 2005/0249225 A1 | 11/2005 | Singhal |
| 2005/0259586 A1 | 11/2005 | Hafid et al. |
| 2006/0036733 A1 | 2/2006 | Fujimoto et al. |
| 2006/0064478 A1* | 3/2006 | Sirkin ................ H04L 29/12066 709/223 |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0271823 A1* | 11/2006 | Smith .................... H04L 43/18 714/37 |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1* | 7/2007 | O'Rourke ............ H04L 12/287 370/389 |
| 2007/0255847 A1* | 11/2007 | Smith .................... H04L 41/00 709/231 |
| 2007/0259673 A1 | 11/2007 | Willars et al. |
| 2007/0274285 A1 | 11/2007 | Werber et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0263209 A1 | 10/2008 | Pisharody et al. |
| 2008/0271130 A1 | 10/2008 | Ramamoorthy |
| 2008/0320151 A1 | 12/2008 | McCanne et al. |
| 2009/0037361 A1 | 2/2009 | Prathaban et al. |
| 2009/0106830 A1 | 4/2009 | Maher |
| 2009/0141634 A1 | 6/2009 | Rothstein et al. |
| 2009/0213858 A1 | 8/2009 | Dolganow et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0131654 A1* | 5/2010 | Malakapalli ........... H04L 67/08 709/227 |
| 2010/0162378 A1 | 6/2010 | Jayawardena et al. |
| 2010/0188975 A1 | 7/2010 | Raleigh |
| 2010/0235880 A1 | 9/2010 | Chen et al. |
| 2010/0312740 A1 | 12/2010 | Clemm et al. |
| 2011/0013525 A1 | 1/2011 | Breslau et al. |
| 2011/0064083 A1 | 3/2011 | Borkenhagen et al. |
| 2011/0099403 A1 | 4/2011 | Miyata et al. |
| 2011/0110294 A1 | 5/2011 | Valluri et al. |
| 2011/0153721 A1* | 6/2011 | Agarwal ................ H04L 69/16 709/203 |
| 2011/0153834 A1 | 6/2011 | Bharrat |
| 2011/0185073 A1 | 7/2011 | Jagadeeswaran et al. |
| 2011/0276695 A1 | 11/2011 | Maldaner |
| 2011/0292939 A1 | 12/2011 | Subramaian et al. |
| 2012/0023231 A1 | 1/2012 | Ueno |
| 2012/0066371 A1* | 3/2012 | Patel .................... H04L 67/1031 709/224 |
| 2012/0084460 A1 | 4/2012 | McGinnity et al. |
| 2012/0117571 A1* | 5/2012 | Davis .................... H04L 41/0806 718/105 |
| 2012/0144014 A1 | 6/2012 | Natham et al. |
| 2012/0151353 A1 | 6/2012 | Joanny |
| 2012/0155495 A1 | 6/2012 | Clee et al. |
| 2012/0173759 A1* | 7/2012 | Agarwal ............ H04L 67/2814 709/241 |
| 2012/0203825 A1* | 8/2012 | Choudhary ......... H04L 65/4076 709/203 |
| 2012/0239792 A1 | 9/2012 | Banerjee et al. |
| 2012/0240185 A1 | 9/2012 | Kapoor et al. |
| 2013/0007225 A1 | 1/2013 | Gage et al. |
| 2013/0074177 A1 | 3/2013 | Varadhan et al. |
| 2013/0083725 A1 | 4/2013 | Mallya et al. |

(56) References Cited

U.S. PATENT DOCUMENTS

| | | |
|---|---|---|
| 2013/0089099 A1 | 4/2013 | Pollock et al. |
| 2013/0091273 A1 | 4/2013 | Ly et al. |
| 2013/0148500 A1 | 6/2013 | Sonoda et al. |
| 2013/0166731 A1 | 6/2013 | Yamanaka et al. |
| 2013/0191548 A1 | 7/2013 | Boddukuri et al. |
| 2013/0262702 A1 | 10/2013 | Davis |
| 2013/0282791 A1 | 10/2013 | Kruglick |
| 2013/0311686 A1 | 11/2013 | Fetterman et al. |
| 2014/0047115 A1 | 2/2014 | Lipscomb et al. |
| 2014/0164617 A1 | 6/2014 | Jalan et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0330982 A1 | 11/2014 | Jalan et al. |
| 2014/0334485 A1 | 11/2014 | Jain et al. |
| 2015/0085650 A1 | 3/2015 | Cui et al. |
| 2015/0215436 A1 | 7/2015 | Kancherla |
| 2015/0281087 A1 | 10/2015 | Jalan et al. |
| 2015/0350383 A1 | 12/2015 | Davis |
| 2015/0381465 A1 | 12/2015 | Narayanan et al. |
| 2016/0036778 A1 | 2/2016 | Chen et al. |
| 2016/0050233 A1 | 2/2016 | Chen et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0173579 A1 | 6/2016 | Jalan et al. |
| 2016/0261642 A1 | 9/2016 | Chen et al. |
| 2017/0041350 A1 | 2/2017 | Chen et al. |

FOREIGN PATENT DOCUMENTS

| | | |
|---|---|---|
| CN | 101567818 A | 10/2009 |
| CN | 102104548 A | 6/2011 |
| CN | 102918801 A | 2/2013 |
| CN | 103365654 A | 10/2013 |
| CN | 102918801 B | 5/2016 |
| EP | 0648038 A2 | 4/1995 |
| EP | 1770915 A1 | 4/2007 |
| EP | 1885096 A1 | 2/2008 |
| EP | 2577910 A2 | 4/2013 |
| HK | 1183569 A | 12/2013 |
| HK | 1188498 A | 5/2014 |
| JP | 2001298449 A | 10/2001 |
| JP | 2013528330 A | 7/2013 |
| JP | 5946189 B2 | 7/2016 |
| WO | WO2011149796 A2 | 12/2011 |
| WO | WO2014088741 A1 | 6/2014 |
| WO | WO2014144837 A1 | 9/2014 |
| WO | WO2014179753 A2 | 11/2014 |

OTHER PUBLICATIONS

Samar, V., "Single Sign-On Using Cookies for Web Applications," IEEE 8th International Workshop, 1999, pp. 158-163.

"Allot Announces the General Availability of its Directory Services-Based NetPolicy™ Manager," Allot communications, Tel Aviv, Israel, Feb. 28, 2000, 2 pages.

"Allot Communications Announces Business-Aware Network Policy Manager," Allot Communications, Sophia Antipolis, France, Sep. 20, 1999, 2 pages.

"Allot Communications Announces Directory Services Based Network Policy Manager," Allot Communications, Los Gatos, California, Apr. 5, 1999, 2 pages.

"Allot Communications Announces the Netenforcer Family of IP Traffic Management Products: Fault-Tolerant, Scaleable, Policy-Based Bandwidth Management, QOS, SLA Solutions," Allot Communications, Burlingame, California, Dec. 13, 1999, 2 pages.

"Allot Communications Launches NetEnforcer with NetWizard, the Fastest Way to Implement Accurate and Reliable Network QoS Policies," Allot Communications, Burlingame, California, Jan. 25, 2001, 2 pages.

"Allot Introduces Turnkey Next Generation IP Service and Creation Solution—the Virtual Bandwidth Manager," Allot communications, Atlanta, Georgia, SUPERCOMM 2000, Booth #8458, Jun. 5, 2000, 2 pages.

"Data Communications Awards Allot Communications 'Hot Product' in Internetworking/IP Tools Category," Allot Communications, Los Gatos, California, Jan. 18, 1999, 2 pages.

"Policy-Based Network Architecture," Allot Communications, 2001, 12 pages.

Dahlin, A. et al, "Eddie A Robust and Scalable Internet Server," Ericsson Telecom AB, Stockholm, Sweden, pp. 1-7 (May 1998).

Aron, Mohit et al., "Efficient Support for P-HTTP in Cluster-Based Web Servers," Proceedings of 1999 Annual Usenix Technical Conference, Monterey, California, Jun. 1999, 14 pages.

Aron, Mohit et al., "Scalable Content-aware Request Distribution in Cluster-based Network Servers," Proceedings of the 2000 Annual Usenix Technical Conference, San Diego, California, Jun. 2000, 15 pages.

Aron, Mohit, "Scalable Content-aware Request Distribution in Cluster-based Network Servers," Department of Computer Science, Rice University [Online, retreived on Mar. 13, 2001], Retreived from the Internet: <URL:http://softlib.rice.edu/softlib/scalableRD.html>, 8 pages.

"ACEdirector™: 8-Port 10/100 Mbps Ethernet Switch," Alteon WebSystems, San Jose, California (1999), 2 pages.

"Enhancing Web User Experience with Global Server Load Balancing," Alteon WebSystems, San Jose, California, Jun. 1999, 8 pages.

"The Next Step in Server Load Balancing," Alteon WebSystems, San Jose, California, Nov. 1999, 16 pages.

"1.3.1.2.5 Virtual IP Addressing (VIPA)," excerpt from "IP Configuration" [online], IBM Corporation, 1998 [retrieved on Sep. 8, 1999], retreived from the Internet: <URL:http://w3.enterlib.ibm.com:80/cgi-bin/bookmgr/books/F1AF7001/1.3.1.2>, 4 pages.

"1.3.20 DEVICE and LINK Statement—Virtual Devices (VIPA)," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 3 pages.

"1.3.23 HOME Statement," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 6 pages.

Devine, Mac, "TCP/IP Application Availability and Workload Balancing in the Parallel Sysplex," SHARE Technical Conference, Aug. 22-27, 1999, 17 pages.

Pai, Vivek S. et al., "Locality-Aware Request Distribution in Cluster-based Network Servers," Proceedings of the 8th International Conference on Architectural Support for Programming Languages and Operating Systems (ASPLOS VIII), San Jose, CA, Oct. 1998, 12 pages.

Apostolopoulos, G. et al., "Design, Implementation and Performance of a Content-Based Switch," INFOCOM 2000, Nineteenth Annual Joint Conference of the IEEE Computer and Communication Societies, IEEE, Mar. 2000, pp. 1117-1126, vol. 3.

* cited by examiner

FORWARDING POLICIES ON A VIRTUAL SERVICE NETWORK

CROSS-REFERENCE TO RELATED APPLICATIONS

The present application is a continuation of, and claims the priority benefit of, U.S. patent application Ser. No. 15/048,290 filed on Feb. 19, 2016, entitled "Forwarding Policies on a Virtual Service Network," issued on Jan. 10, 2017 as U.S. Pat. No. 9,544,364, which in turn is a continuation of U.S. patent application Ser. No. 13/706,363 filed on Dec. 6, 2012, entitled "Forwarding Policies on a Virtual Service Network," issued on May 10, 2016 as U.S. Pat. No. 9,338,225, the disclosures of which are incorporated herein by reference in their entirety for all purposes.

BACKGROUND OF THE INVENTION

Field

This invention relates generally to data communications, and more specifically, to a virtual service network.

Background

Service load balancers such as server load balancers or application delivery controllers typically balance load among a plurality of servers providing network services such as Web documents, voice calls, advertisements, enterprise applications, video services, gaming, or consuming broadband services. A service is used by many client computers. Some services are offered for few clients and some services are offered to many clients. Typically a service is handled by a service load balancer. When there are many clients utilizing the service at the same time, the service load balancer will handle the distribution of client service accesses among the servers. However, as the capacity of the service load balancer is reached, a network administrator cannot easily add a second service load balancer, since a service is typically assigned to an IP address of the service load balancer. Adding another service load balancer having the same IP address for the service is not possible in a data network. Network nodes in the data network would not be able to determine which service load balancer to send a client service access to.

The scaling of service demand has not been a problem in the past as computing capacity of service load balancer was able to keep up with client service demand. However, as mobile computing becomes pervasive and as more traditional non-networking services such as television, gaming, and advertisement are migrating to data networks, the demand for client services has surpassed the pace of processing improvement. The need to scale to a plurality of service load balancers to support a network service is imminent.

The present invention describes a virtual service network wherein network nodes in the virtual service network are capable of processing client service sessions of a network service and forwarding the sessions to a plurality of service load balancers.

BRIEF SUMMARY OF THE INVENTION

According to one embodiment of the present invention, a method for providing forwarding policies in a virtual service network, the virtual service network comprising a network node and a pool of service load balancers serving a virtual service associated with a virtual service network address, comprises: receiving a virtual service session request from a client device by the network node, the virtual service session request comprising the virtual service network address for the virtual service served by the pool of service load balancers, wherein the network node comprises at least one packet forwarding policy, each packet forwarding policy comprising a virtual service network address associated with a destination; comparing by the network node the virtual service network address in the virtual service session request with the virtual service network address in each packet forwarding policy; in response to finding a match between the virtual service network address in the virtual service session request and a given virtual service network address in a given packet forwarding policy, determining the given destination in the given packet forwarding policy by the network node; and sending the virtual service session request to a service load balancer in the pool of service load balancers associated with the given destination, wherein the service load balancer establishes a virtual service session with the client device.

In one aspect of the present invention, after the service load balancer establishes the virtual service session with the client device, the method further comprises: receiving a virtual service request from the client device through the virtual service session by the network node, the virtual service request comprising the virtual service network address for the virtual service; comparing by the network node the second virtual service network address in the virtual service request with the virtual service network address in each packet forwarding policy; in response to finding a match between the virtual service network address in the virtual service request and a second given virtual service network address in a second given packet forwarding policy, determining a second given destination in the second given packet forwarding policy by the network node; and sending the virtual service request to a second service load balancer associated with the second given destination by the network node.

In one aspect of the present invention, the method further comprises: receiving a virtual service data packet from the client device through the virtual service session by the network node, the virtual service data packet comprising the virtual service network address for the virtual service; comparing by the network node the virtual service network address in the virtual service data packet with the virtual service network address in each packet forwarding policy; in response to finding a match between the virtual service network address in the virtual service data packet and a third given virtual service network address in a third given packet forwarding policy, determining a third given destination in the third given packet forwarding policy by the network node; and sending the virtual service data packet to a third service load balancer associated with the third given destination by the network node.

In one aspect of the present invention, the service load balancer, the second service load balancer, and the third service load balancer are the same service load balancer.

In one aspect of the present invention, the method further comprises: receiving a data packet of the virtual service session by the network node from the service load balancer over a data network, the data packet comprising a client network address of the client device; retrieving the client network address from the data packet by the network node; and sending the data packet to the client device using the client network address by the network node.

In one aspect of the present invention, the data packet comprises a virtual service session request response or a virtual service request response.

In one aspect of the present invention, the given destination comprises a second network node, wherein the sending the virtual service session request to a service load balancer in the pool of service load balancers associated with the given destination comprises: sending the virtual service session request to the second network node, wherein the second network node comprises a second at least one packet forwarding policy, each of the second at least one packet forwarding policies comprising a second virtual service network address associated with a second destination; comparing by the second network node the virtual service network address in the virtual service session request with the virtual service network address in each of the second at least one packet forwarding policies; in response to finding a match between the virtual service network address in the virtual service session request and a second given virtual service network address in a second given packet forwarding policy, determining a second given destination in the second given packet forwarding policy by the second network node; and sending the virtual service session request to the service load balancer associated with the second given destination, wherein the service load balancer establishes a virtual service session with the client device.

In one aspect of the present invention, the determining the given destination in the given packet forwarding policy by the network node comprises: finding by the network node that the virtual service network address in the virtual service session request matches a first virtual service network address in a first packet forwarding policy and a second virtual service network address in a second packet forwarding policy; selecting by the network node either the first packet forwarding policy or the second packet forwarding policy based on additional information comprised in the first and second packet forwarding policies; and determining the given destination in the selected packet forwarding policy by the network node.

In one aspect of the present invention, wherein the additional information comprises one or more of the following: a multi-path factor; and a traffic policy.

In one aspect of the present invention, the first packet forwarding policy comprises a first destination associated with a first service load balancer in the pool of service load balancers, and the second packet forwarding policy comprises a second destination associated with a second service load balancer in the pool of service load balancers, wherein the first service load balancer is different from the second service load balancer, wherein the determining the given destination in the selected packet forwarding policy by the network node comprises: in response to selecting the first packet forwarding policy, determining the first destination associated with the first service load balancer in the first packet forwarding policy by the network node; and in response to selecting the second packet forwarding policy, determining the second destination associated with the second service load balancer in the second packet forwarding policy by the network node.

In one aspect of the present invention, the network node comprises a first at least one packet forwarding policy for a first virtual service and a second at least one packet forwarding policy for a second virtual service, wherein the comparing by the network node the virtual service network address in the virtual service session request with the virtual service network address in each packet forwarding policy comprises: determining by the network node whether the virtual service session request is for the first virtual service or the second virtual service; in response to determining that the virtual service session request is for the first virtual service, comparing by the network node the virtual service network address in the virtual service session request with a virtual service network address in each of the first packet forwarding policies; and in response to determining that the virtual service session request is for the first virtual service, comparing by the network node the virtual service network address in the virtual service session request with a virtual service network address in each of the second packet forwarding policies.

In one aspect of the present invention, the virtual service session request further comprises a client network address of the client device, and each packet forwarding policy further comprises a client network address associated with the destination, wherein the comparing by the network node the virtual service network address in the virtual service session request with the virtual service network address in each packet forwarding policy and the determining the given destination in the given packet forwarding policy by the network node comprise: comparing by the network node the virtual service network address in the virtual service session request with the virtual service network address in each packet forwarding policy; comparing by the network node the client network address in the virtual service session request with the client network address in each packet forwarding policy; and in response to finding the match between the virtual service network address in the virtual service session request and the given virtual service network address in the given packet forwarding policy, and in response to finding a match between the client network address in the virtual service session request and the given client network address in the given packet forwarding policy, determining the given destination in the given packet forwarding policy by the network node.

System and computer program products corresponding to the above-summarized methods are also described and claimed herein.

According to another embodiment of the present invention, a method for providing forwarding policies in a virtual service network, the virtual service network comprising a network node and a pool of service load balancers serving a virtual service associated with a virtual service network address, comprising: receiving a virtual service session request from a client device by the network node, the virtual service session request comprising a client device network address for the client device and the virtual service network address for the virtual service served by the pool of service load balancers, wherein the network node comprises at least one packet forwarding policy comprising a client network address and a virtual service network address associated with a destination; comparing by the network node the virtual service network address in the virtual service session request with a first virtual service network address in a first packet forwarding policy of the at least one packet forwarding policies, and comparing the client device network address in the virtual service session request with a first client network address in the first packet forwarding policy; in response to determining that the virtual service network address in the virtual service session request matches the first virtual service network address, and determining that the client device network address in the virtual service session request does not match the first client network address, determining by the network node that the first packet forwarding policy does not apply to the virtual service session request; in response to determining that the first packet forwarding policy does not apply, comparing by the network node the virtual service network address in the virtual service session request with a second virtual service network address in a second packet forwarding policy of the at least one packet forwarding policies, and comparing the client device network address in the virtual service session request with a second client network address in the second packet forwarding policy; in response to determining that the virtual service network address in the virtual service session request matches the second virtual service network address, and determining that the client device network address in the virtual service session request matches the second client network address, determining by the network node that the second packet forwarding policy applies to the virtual service session request; in response to determining that the second packet forwarding policy applies, determining a given destination in the second packet forwarding policy by the network node; and sending the virtual service session request to a service load balancer in the pool of service load balancers associated with the given destination, wherein the service load balancer establishes a virtual service session with the client device.

DETAILED DESCRIPTION OF THE INVENTION

Figure 1:
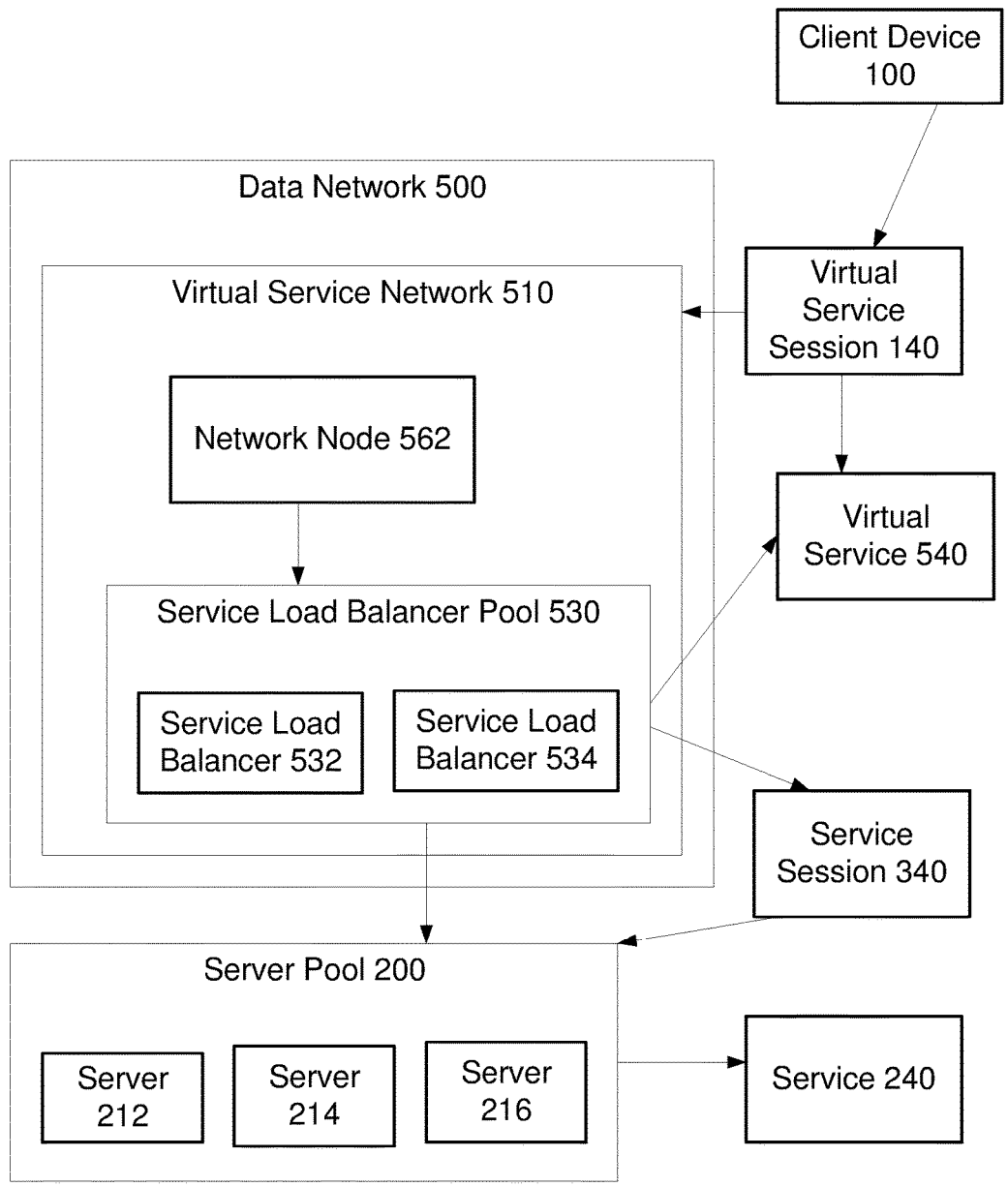
FIG. 1 illustrates a virtual service network for a service according to an embodiment of the present invention.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a virtual service network for a service according to an embodiment of the present invention. Virtual service network 510 includes a network node 562 and a service load balancer pool 530, which includes, in one embodiment, a plurality of service load balancers 532, 534. Network node 562 and service load balancer pool 530 are connected in virtual service network 510 such that network node 562 can forward packets to service load balancers 532-534 and vice versa.

In one embodiment, virtual service network 510 is configured over a data network 500. In this embodiment, network node 562 and service load balancers 532-534 are a part of data network 500. In one embodiment, network node 562 connects directly to service load balancers 532-534 and forwards data packets directly to service load balancers 532-534. In one embodiment, network node 562 forwards data packets through one or more network elements (not shown) in data network 500.

In one embodiment, service load balancers 532-534 send data packets to network node 562 through data network 500, using one or more network elements in data network 500 if necessary.

In one embodiment, data network 500 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 500 resides in a data center, or connects to a network or application network cloud.

In one embodiment, network node 562 includes, in addition to that described later in this specification, the functionality of a network switch, an Ethernet switch, an IP router, an ATM switch, a stackable switch, a broadband remote access system (BRAS), a cable head-end, a mobile network gateway, a home agent gateway (HA-Gateway), a PDSN, a GGSN, a broadband gateway, a VPN gateway, a firewall, or a networking device capable of forwarding packets in data network 500.

In some embodiments, service load balancer 534 includes functionality of a server load balancer, an application delivery controller, a service delivery platform, a traffic manager, a security gateway, a component of a firewall system, a component of a virtual private network (VPN), a load balancer for video servers, a gateway to distribute load to one or more servers, or a gateway performing network address translation (NAT).

Service load balancer pool 530 connects to server pool 200, which in an embodiment includes a plurality of servers 212, 214, 216. Servers 212-216 of server pool 200 serve service 240. Service load balancers 532-534 of service load balancer pool 530 serve service 240 as virtual service 540.

In some embodiments, server 212 includes functionality of a Web server, a file server, a video server, a database server, an application server, a voice system, a conferencing server, a media gateway, a media center, an app server or a network server providing a network or application service to client device 100 using a Web protocol.

In some embodiments, service 240 includes a Web service, a HTTP service, a FTP service, a file transfer service, a video or audio streaming service, an app download service, an advertisement service, an on-line game service, a document access service, a conferencing service, a file sharing service, a group collaboration service, a database access service, an on-line transaction service, a Web browsing service, a VOIP service, a notification service, a messaging service, or an Internet data communication service.

Each service load balancer, for example service load balancer 532, can exchange data packets to one or more servers in server pool 200.

Client device 100 is a computing device connecting to virtual service network 510. In one embodiment, in order to utilize service 240, client device 100 establishes a virtual service session 140 for virtual service 540 with service load balancer pool 530 through virtual service network 510. Service load balancer pool 530 establishes service session 340 with server pool 200 and relays data packets between virtual service session 140 and service session 340. In this embodiment, server pool 200 provides the service 240 to client device 100. In some embodiments, client device 100 is a personal computer, a laptop computer, a desktop computer, a smartphone, a feature phone, a tablet computer, an e-reader, an end-use networked device, a server computer, a service proxy computer, a service gateway, a business computer, a server computer, or a computer requesting service 240.

Figure 2A:
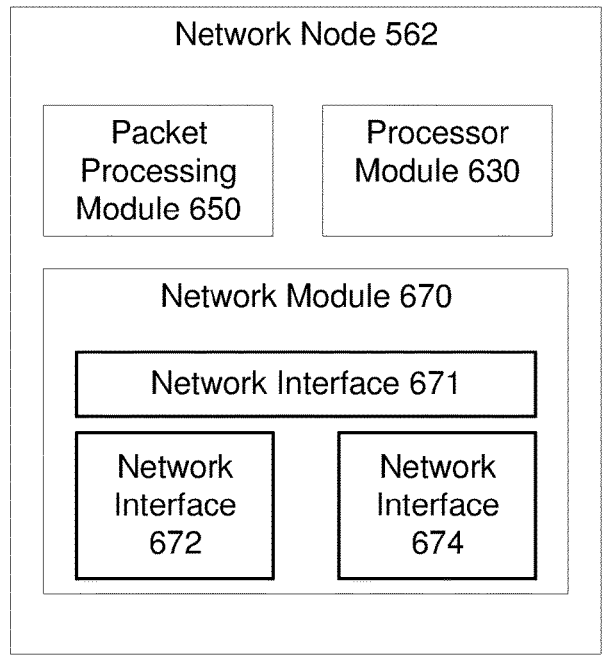
FIG. 2A illustrates a component view of network node according to an embodiment of the present invention.
Figure 2B:
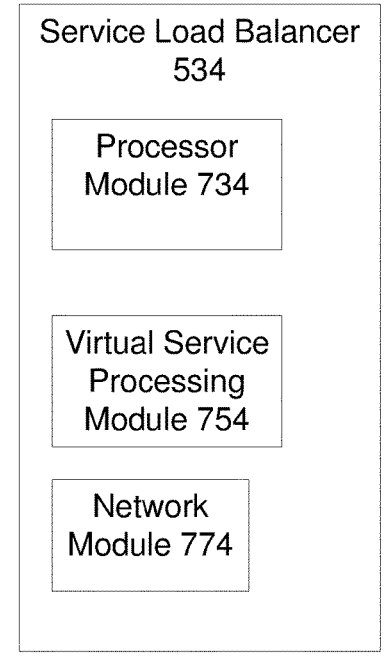
FIG. 2B illustrates a component view of service load balancer according to an embodiment of the present invention.
Figure 2C:
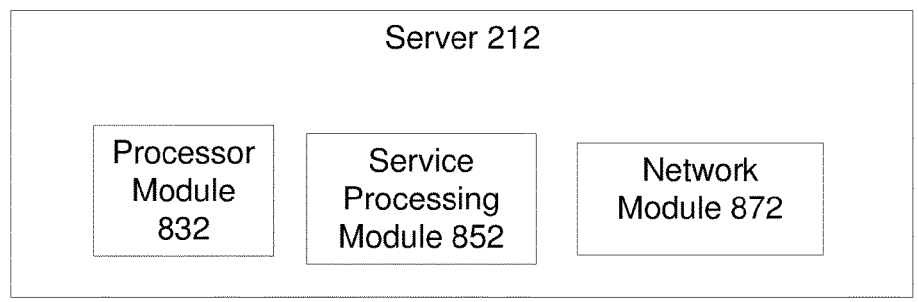
FIG. 2C illustrates a component view of server according to an embodiment of the present invention.

FIGS. 2A-2C illustrate components of network node 562, service load balancer 534, and server 212 according to an embodiment of the present invention.

In one embodiment illustrated in FIG. 2A, network node 562 includes processor module 630, packet processing module 650, and network module 670. In one embodiment, processor module 630 includes one or more processors and a computer readable medium storing programming instructions. In one embodiment, processor module 630 includes storage such as random accessible memory (RAM). In one embodiment, packet processing module 650 includes a processor or a network processor capable of processing data packets. In one embodiment, packet processing module 650 is part of processor module 630. In one embodiment, packet processing module 650 is a physical card or module housing a network processor. In one embodiment packet processing module 650 includes storage such as random access memory (RAM), context addressable memory (CAM), tertiary CAM (TCAM), static random access memory (SRAM) or other memory component. In one embodiment, packet processing module 650 includes a plurality of programming instructions. In one embodiment, network module 670 interacts with data network 500 and virtual service network 510 to transmit and receive data packets. In one embodiment, network module 670 includes a plurality of network interfaces such as network interface 671, network interface 672, and network interface 674. Each of the network interfaces connect to another network component. For example, in one embodiment, network interface 671 connects to client device 100; network interface 672 connects to service load balancer 532; and network interface 674 connects to service load balancer 534. In one embodiment, network interface 671 connects to client device 100 and service load balancer pool 530. In one embodiment, network interface 671 is an Ethernet, Gigabit Ethernet, 10-Gigabit Ethernet, ATM, MPLS, wireless network, or optical network interface.

FIG. 2B illustrates a service load balancer such as service load balancer 534 according to an embodiment of the present invention. In one embodiment, service load balancer 534 includes processor module 734, virtual service processing module 754 and network module 774. Network module 774 interacts with data network 500 and virtual service network 510 to transmit and receive data packets. In one embodiment, network module 774 exchanges data packets with network node 562 and server pool 200. Network module 774 includes a network interface card or network interface module connecting to data network 500 and virtual service network 510. In one embodiment, processor module 734 includes a processor and computer readable medium storing programming instructions. In one embodiment, virtual service processing module 754 includes a physical hardware comprising a processor or a network processor, a memory module such as RAM. In one embodiment, virtual service processing module 754 is included in processor module 734. In one embodiment, virtual service processing module 754 includes storage storing programming instructions.

FIG. 2C illustrates a server, such as server 212, according to an embodiment of the present invention. In one embodiment, server 212 includes processor module 832, service processing module 852 and network module 872. Network module 872 interacts with virtual service network 510 to transmit or receive data packets. In one embodiment, network module 872 exchanges data packets with service load balancer pool 530. Network module 872 includes a network interface card or network interface module connecting to data network 500 or virtual service network 510. In one embodiment, processor module 832 includes a processor and computer readable medium storing programming instructions. In one embodiment, service processing module 852 includes a physical hardware comprising a processor or a network processor, a memory module such as RAM. In one embodiment, service processing module 852 is included in processor module 832. In one embodiment, service processing module 852 includes storage storing programming instructions executed by server 212.

Figure 3A:
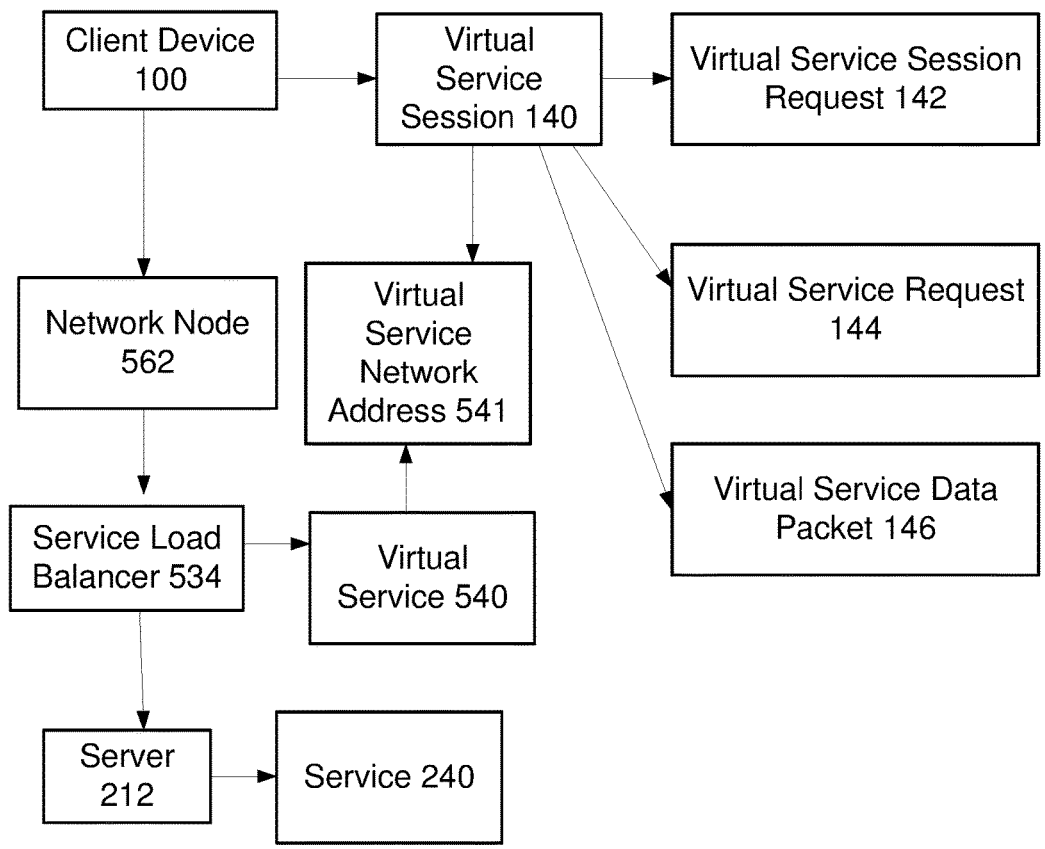
FIG. 3A illustrates a virtual service session according to an embodiment of the present invention.

FIG. 3A illustrates a session between a client device and a server according to an embodiment of the present invention. In one embodiment, client device 100 uses service 240 by conducting virtual service session 140 using virtual service 540. In one embodiment, virtual service session 140 is a IP session, a UDP session, a TCP session, a SIP session, an ICMP session, a GRE session, a RTSP session, an SSL session, a HTTPS session, or a HTTP session. In one embodiment, virtual service 540 includes a virtual service network address 541, such as an IP network address. In one embodiment, the virtual service network address 541 is shared among the service load balancers in the service load balancer pool 530. In one embodiment, virtual service network address 541 includes a transport layer identity such as a port number, a TCP port, a UDP port. In one embodiment, client device 100 sends a virtual service session request 142, such as a TCP session request data packet, to network node 562. Virtual service session request 142 includes virtual service network address 541. In one embodiment, network node 562 determines that virtual service session request 142 is to be sent to service load balancer 534, based on virtual service network address 541. Service load balancer 534 establishes virtual service session 140 with client device 100.

After establishing virtual service session 140, client device 100 sends a virtual service request 144 through virtual service session 140 to service load balancer 534. Service load balancer 534 determines that virtual service request 144 is to be relayed to server 212. Subsequently client device 100 exchanges virtual service data packet 146 with server 212 via service load balancer 534.

Figure 3B:
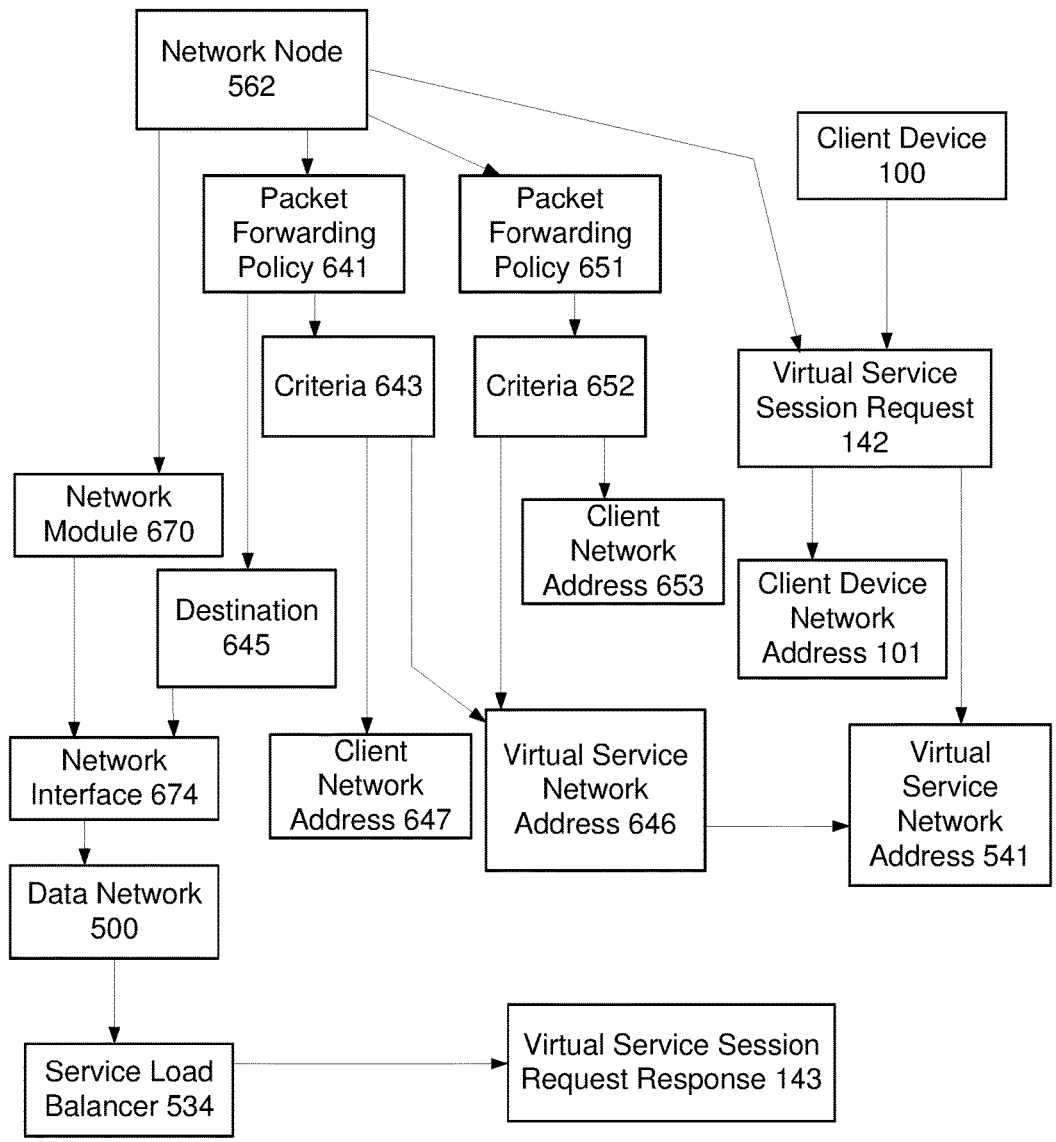
FIG. 3B illustrates processing of a virtual service session request according to an embodiment of the present invention.

FIG. 3B illustrates processing of virtual service session request 142 according to an embodiment of the present invention. Client device 100 sends virtual service session request 142 to network node 562. In one embodiment, virtual service session request 142 data packet includes virtual service network address 541, and client network address 101 (also referred to herein as client device network address). In one embodiment, client network address 101 includes an IP address of client device 100, and optionally a transport layer address. Network node 562 selects service load balancer 534, based on a packet forwarding policy 641, and forwards virtual service session request 142 to service load balancer 534. Packet forwarding policy 641 includes criteria 643 and destination 645. Criteria 643 contain matching information for network node 562 to match against virtual service session request 142. Destination 645 includes information to transmit virtual service session request 142. In one embodiment, destination 645 indicates using network interface 674 to transmit virtual service session request 142. Network node 562 informs network module 670 to transmit virtual service session request 142 using network interface 674. In one embodiment, network interface 674 directly connects to service load balancer 534 and service load balancer 534 receives virtual service session request 142. In one embodiment, network interface 674 connects to service load balancer 534 via data network 500 and service load balancer 534 receives virtual service session request 142 via data network 500.

Network node 562 compares criteria 643 against virtual service session request 142. In one embodiment, network node 562 retrieves virtual service network address 541 from virtual service session request 142. In one embodiment, criteria 643 include virtual service network address 646. Network node 562 compares virtual service network address 541 with virtual service network address 646. In one embodiment, virtual service network address 646 includes virtual service network address 541 and network node 562 finds a match between virtual service network address 541 and virtual service network address 646. In response to finding a match between virtual service network address 541 and virtual service network address 646, the network node 562 applies the packet forwarding policy 641 to the virtual service session request 142 by informing the network module 670 to transmit the virtual service session request 142 using the network interface 674 indicated by destination 645.

In one embodiment, virtual service network address 646 includes a transport layer address such as TCP port number, UDP port number or other transport layer information. Network node 562 retrieves transport layer address from virtual service network address 541 and compares with virtual service network address 646. In one embodiment, network node 562 finds a match of the transport layer addresses, network node 562 determines that packet forwarding policy 641 is to be applied to virtual service session request 142. In one embodiment, virtual service network address 646 includes a range of network addresses. In finding that virtual service network address 541 is included in the range of network addresses, network node 562 determines there is a match. In one embodiment, virtual service network address 646 includes a range of transport layer addresses. In finding that transport layer address of virtual service network address 541 is included in the range of transport layer addresses, network node 562 determines there is a match.

In one embodiment, criteria 643 include client network address 647. Network node 562 obtains client device network address 101 from virtual service session request 142 and compares client network address 647 with client device network address 101. If there is a match, network node 562 determines packet forwarding policy 641 is applicable. In one embodiment, client network address 647 includes a range of network addresses. In finding that client device network address 101 is included in the range of network addresses, network node 562 determines there is a match.

In one embodiment, network node 562 further includes another packet forwarding policy 651. Packet forwarding policy 651 includes criteria 652, which includes a client network address 653 different from client network address 647 and the same virtual service network address 646 as packet forwarding policy 641. Network node 562 obtains virtual service network address 541 and client device network address 101 from virtual service session request 142. In one embodiment, network node 562 first determines whether packet forwarding policy 651 applies to virtual service session request 142. Network node 562 compares client network address 653 in packet forwarding policy 651 with client device network address 101, and compares virtual service network address 646 in packet forwarding policy 651 with virtual service network address 541. In response to determining that there is no match between the client network address 653 and client device network address 101, the network node 562 determines that packet forwarding policy 651 does not apply. In one embodiment, client network address 653 includes a range of network addresses. In finding that client device network address 101 is not included in the range of network addresses, network node 562 determines there is no match.

Network node 562 then determines whether a different packet forwarding policy applies. In one embodiment, after determining that packet forwarding policy 651 does not apply, network node 562 determines whether packet forwarding policy 641 applies. Network node compares client network address 647 in packet forwarding policy 641 with client device network address 101, and compares virtual service network address 646 in packet forwarding policy 641 with virtual service network address 541. In response to finding a match between client network address 647 and client device network address 101 and a match between the virtual service network address 646 and virtual service network address 541, network node 562 determines packet forwarding policy 641 is applicable.

Upon receiving virtual service session request 142, service load balancer 534 processes the virtual service session request 142 and replies with a virtual service session request response 143, comprising one or more data packets to be transmitted to client device 100. A process to send data packet 143 will be discussed in a later illustration.

In one embodiment, destination 645 includes a modification procedure prior to transmission. Network node 562 applies the modification procedure in destination 645 prior to informing network interface 674. In one embodiment, destination 645 indicates an IP tunneling modification, a VLAN modification, a MPLS modification, a L2TP tunnel, an IP-in-IP tunnel, an IPv6-v4 tunnel modification, an IPsec modification, a packet header modification, a packet payload modification, or other modification procedure related to network interface 674.

Figure 3C:
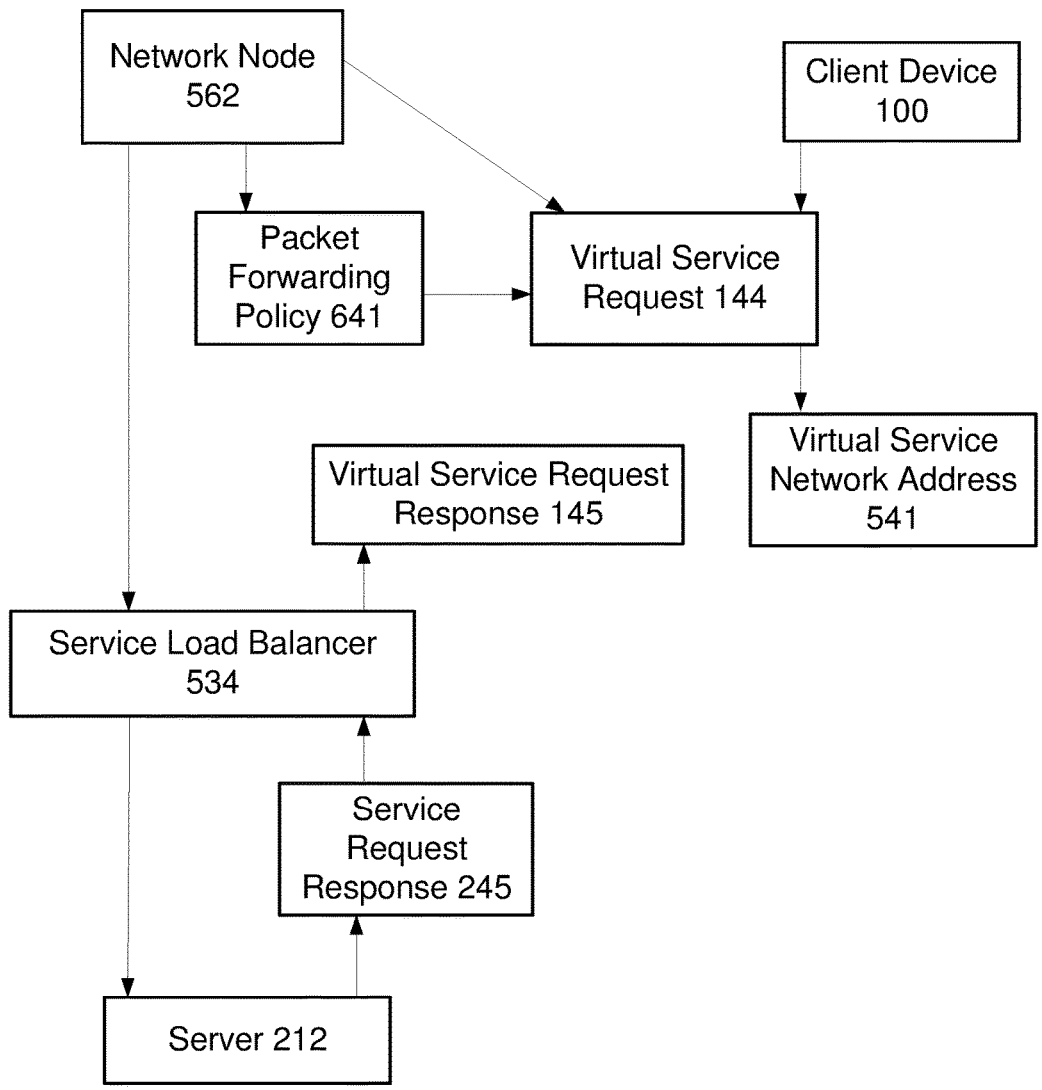
FIG. 3C illustrates processing of a virtual service request according to an embodiment of the present invention.

FIG. 3C illustrates processing of virtual service request 144 according to an embodiment of the present invention. Client device 100 sends virtual service request 144 data packet to network node 562, where the virtual service request 144 includes a virtual service network address 541. In one embodiment, network node 562 processes virtual service request 144 using a similar process illustrated in FIG. 3B, matching the criteria from packet forwarding policy 641 with virtual service request 144 having virtual service network address 541. Network node 562 sends virtual service request 144 to service load balancer 534 according to the application of the matching packet forwarding policy 641.

Service load balancer 534 receives and processes virtual service request 144. Service load balancer 534 selects server 212 to service virtual service request 144 and sends the virtual service request 144 to the server 212. The selection of server 212 is known to those skilled in the art. Any and all such selection process is considered as a part of an embodiment of the present invention and is not described in this specification. Server 212 responds to the virtual service request 144 with a service request response 245 and sends the service request response 245 to service load balancer 534. Service load balancer 534 creates virtual service request response 145 and sends the virtual service request response 145 to client device 100. An embodiment to send virtual service request response 145 from service load balancer 534 to client device 100 will be described in a later illustration in this specification.

Figure 3D:
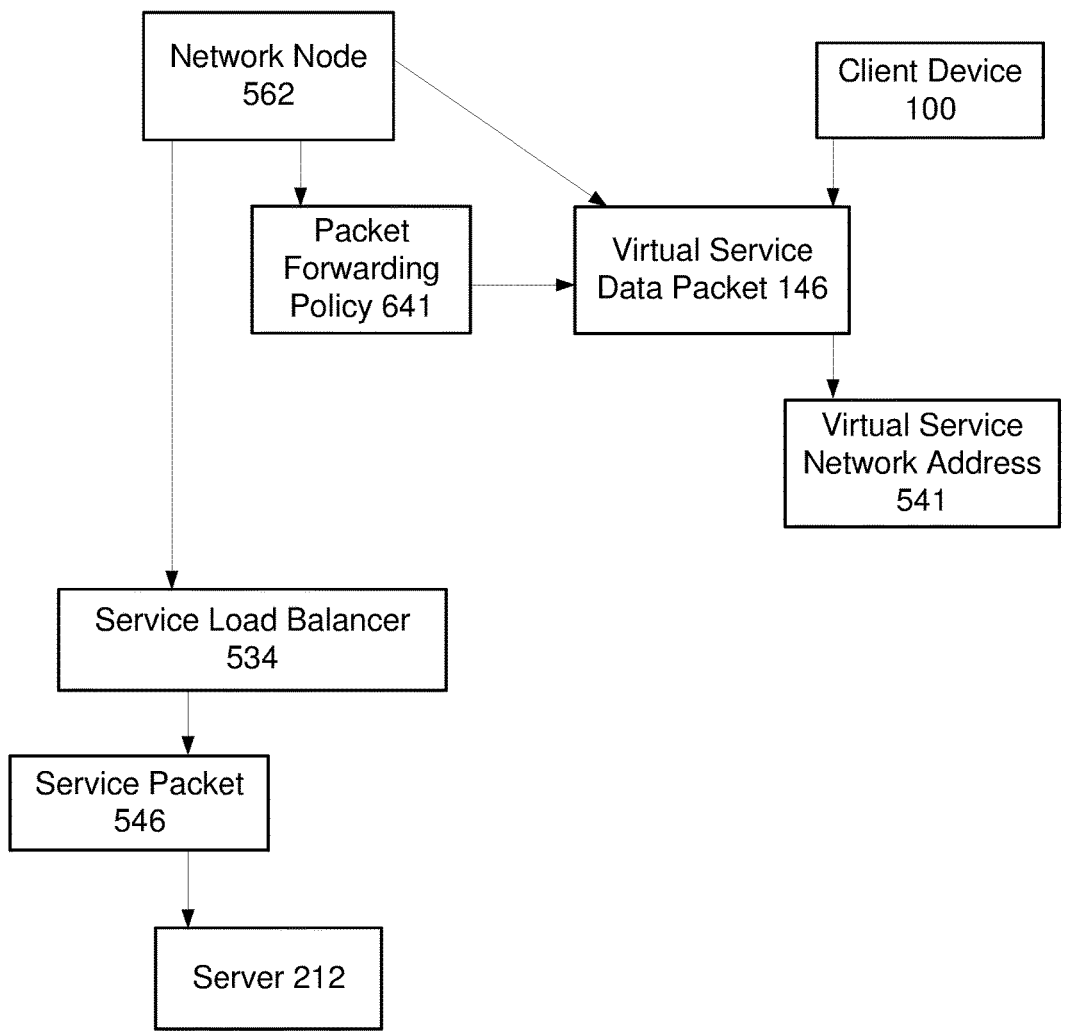
FIG. 3D illustrates processing of a virtual service data packet according to an embodiment of the present invention.

FIG. 3D illustrates processing of virtual service data packet 146 according to an embodiment of the present invention. Client device 100 sends virtual service data packet 146 to network node 562, where the virtual service data packet 146 includes a virtual service network address 541. In one embodiment, network node 562 processes virtual service data packet 146 in a similar process illustrated in FIG. 3B, matching the criteria from packet forwarding policy 641 with virtual service data packet 146 having virtual service network address 541. Network node 562 sends virtual service data packet 146 to service load balancer 534. Service load balancer 534 generates service packet 546 using virtual service data packet 146, and sends service packet 546 to server 212. The process of generating service packet 546 using virtual service data packet 146 is known to those skilled in the art and is not described in this specification.

Figure 4:
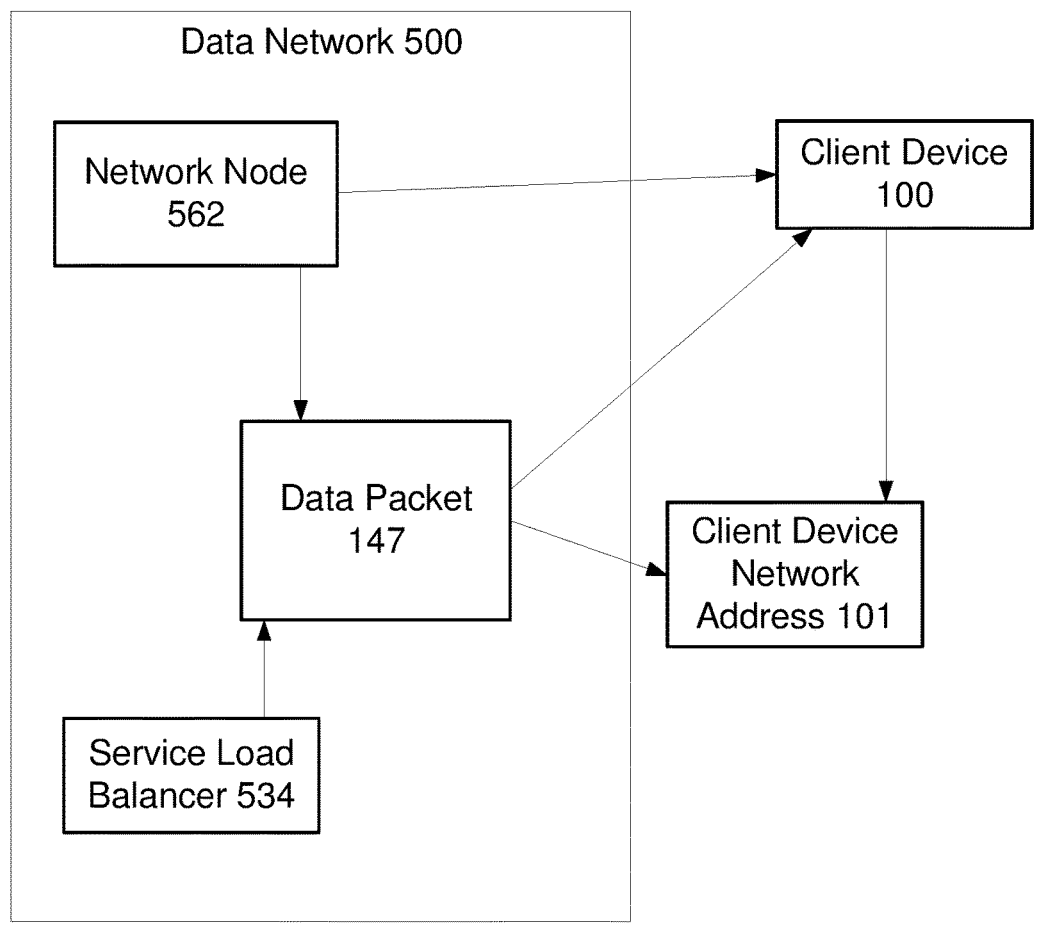
FIG. 4 illustrates processing of a data packet from service load balancer to client device according to an embodiment of the present invention.

FIG. 4 illustrates a process to forward a data packet from service load balancer 534 to client device 100 according to an embodiment of the present invention. In one embodiment, service load balancer 534 sends a data packet 147 of virtual service session 140 to network node 562. In one embodiment, data packet 147 may be virtual service session request response 143 or virtual service request response 145. Data packet 147 includes client device network address 101 of client device 100 as a destination for data packet 147. Service load balancer 534 sends data packet 147 through data network 500 to network node 562, and network node 562 receives data packet 147 from data network 500. In one embodiment, data packet 147 traverses through virtual service network 510 before it is received by network node 562.

Network node 562 retrieves destination client device network address 101 from data packet 147, and determines that data packet 147 is to be sent to client device 100, based on the retrieved client device network address 101.

Figure 5A:
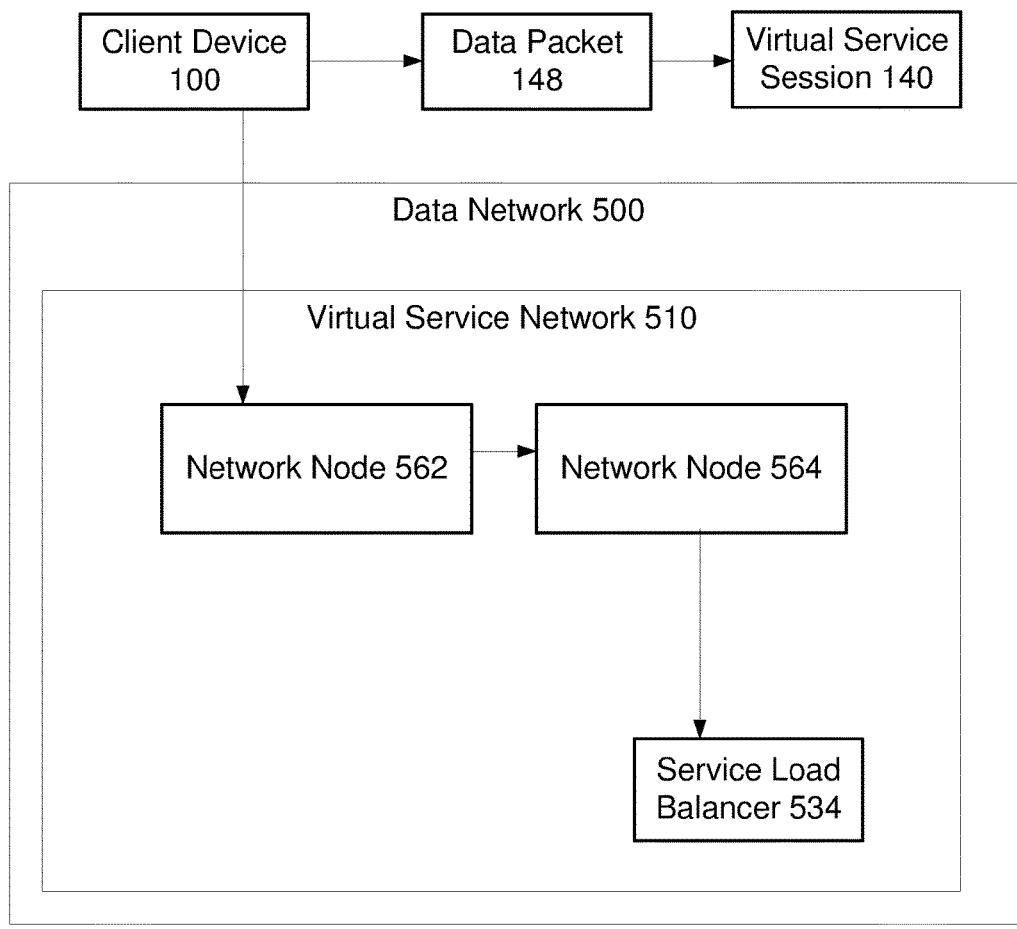
FIG. 5A illustrates a via network node according to an embodiment of the present invention.
Figure 5B:
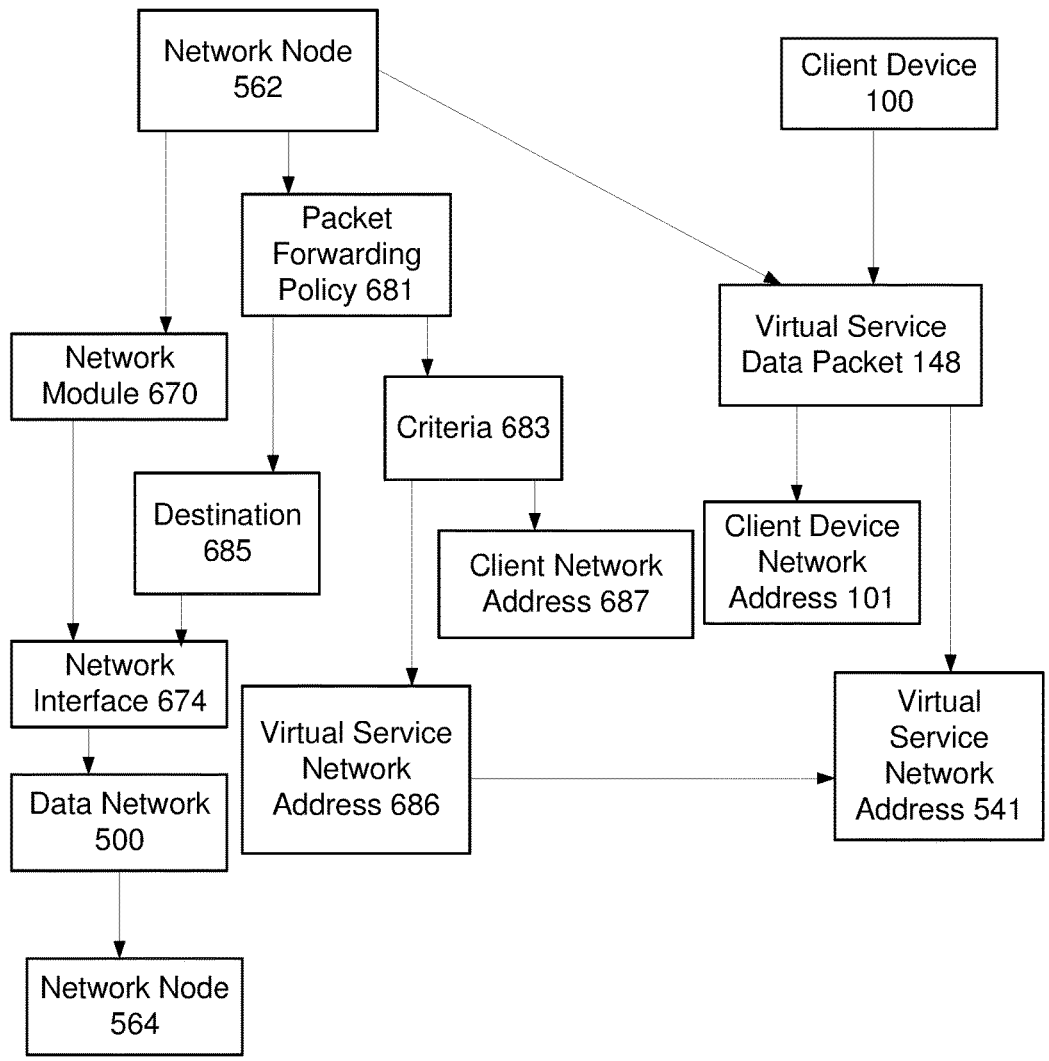
FIG. 5B illustrates forwarding a virtual service data packet to a via network node according to an embodiment of the present invention.

In one embodiment illustrated in FIG. 5A, virtual service network 510 includes a network node 564 connected with network node 562 and service load balancer 534. Network node 562 connects to client device 100. Network node 562 receives virtual service data packet 148 of virtual service session 140 from client device 100. Network node 562 selects network node 564 to receive virtual service data packet 148 from network node 562. FIG. 5B illustrates a process for network node 562 to select network node 564 according to an embodiment of the present invention. Network node 564 receives and processes virtual service data packet 148. Network node 564 sends virtual service data packet 148 to service load balancer 534 according to an embodiment process illustrated in FIGS. 3A-3D.

FIG. 5B illustrates a process of network node 562 to send a virtual service data packet 148 from client device 100 to network node 564 according to an embodiment of the present invention. Client device 100 sends virtual service data packet 148 to network node 562. In one embodiment, data packet 148 includes virtual service network address 541, and client network address 101. Network node 562 selects network node 564, based on a packet forwarding policy 681, and forwards data packet 148 to network node 564. Packet forwarding policy 681 includes criteria 683 and destination 685. Criteria 683 contain matching information for network node 562 to compare against data packet 148. Destination 685 indicates information to transmit data packet 148. In one embodiment, destination 685 indicates network interface 674 is to be used to transmit data packet 148. Network node 562 informs network module 670 to transmit data packet 148 using network interface 674. In one embodiment, network interface 674 directly connects to network node 564 and network node 564 receives data packet 148. In one embodiment, network interface 674 connects to network node 564 via data network 500 and network node 564 receives data packet 148 via data network 500.

Network node 562 matches criteria 683 against data packet 148. In one embodiment, network node 562 retrieves virtual service network address 541 from data packet 148. In one embodiment, criteria 683 include virtual service network address 686. Network node 562 matches virtual service network address 541 with virtual service network address 686. In one embodiment, virtual service network address 686 includes virtual service network address 541 and network node 562 finds a match between virtual service network address 541 and virtual service network address 686.

In one embodiment, virtual service network address 686 includes a transport layer address such as TCP port number, UDP port number or other transport layer information. Network node 562 retrieves transport layer address from data packet 148 and compares the transport layer address with virtual service network address 686. In one embodiment, network node 562 finds a match of the transport layer addresses, network node 562 determines that packet forwarding policy 681 is to be applied to data packet 148. In one embodiment, virtual service network address 686 includes a range of network addresses. In finding that virtual service network address 541 is included in the range of network addresses, network node 562 determines there is a match. In one embodiment, virtual service network address 686 includes a range transport layer addresses. In finding that the transport layer address of data packet 148 is included in the range of transport layer addresses, network node 562 determines there is a match.

In one embodiment, criteria 683 include client network address 687. Network node 562 obtains client device network address 101 from data packet 148 and compares client network address 687 with client device network address 101. If there is a match, network node 562 determines packet forwarding policy 681 is applicable. In one embodiment, client network address 687 includes a range of network addresses. In finding that client device network address 101 is included in the range of network addresses, network node 562 determines there is a match.

In one embodiment, destination 685 indicates a modification process prior to transmission. Network node 562 applies the modification in destination 685 prior to informing network interface 674. In one embodiment, destination 645 indicates an IP tunneling modification, a VLAN modification, a MPLS modification, a L2TP tunnel, a IP-in-IP tunnel, a IPv6-v4 tunnel modification, a IPsec modification, a packet header modification, a packet payload modification, a layer 2 over layer 2 tunnel modification, a layer 3 over layer 2 tunnel modification, a layer 3 over layer 3 tunnel modification, or other modification related to network interface 674.

Figure 6:
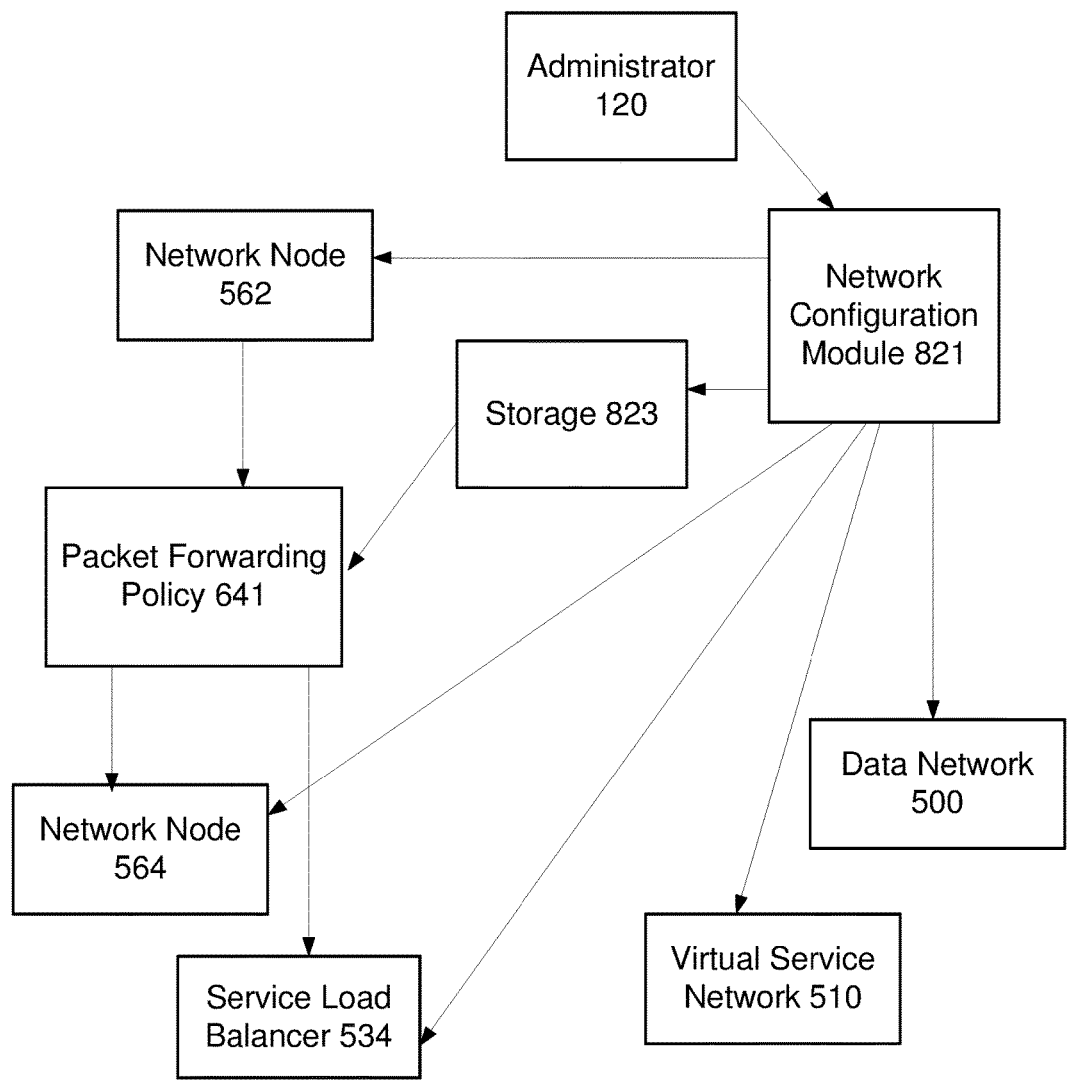
FIG. 6 illustrates a network node configuration according to an embodiment of the present invention.

FIG. 6 illustrates a process to configure a network node with a packet forwarding policy according to an embodiment of the present invention. Network configuration module 821 includes packet forwarding policy 641 which contains a policy to forward a data packet to service load balancer 534 or network node 564. Network configuration module 821 sends packet forwarding policy 641 to network node 562. In one embodiment, network configuration module 821 is a network management system. In one embodiment, network configuration module 821 is a software module within a service load balancer, such as service load balancer 534. In one embodiment, network configuration module 821 is an administrative computing device, wherein a network administrative user provides packet forwarding policy 641 to network configuration module 821. In one embodiment, network configuration module 821 connects to storage 823 wherein storage 823 includes packet forwarding policy 641. Network configuration module 821 retrieves packet forwarding policy 641 and sends to network node 562. In one embodiment, storage 823 includes other packet forwarding policies.

In one embodiment, network configuration module 821 receives packet forwarding policy 641 from administrator 120, and stores packet forwarding policy 641 into storage 823.

In one embodiment, network configuration module 821 connects to service load balancer 534 and detects a change to service load balancer 534, and in response, network configuration module 821 generates packet forwarding policy 641. In one embodiment, a change can be due to a change to virtual service 540 of service load balancer 534, or availability of service load balancer 534. In one embodiment, service load balancer 534 sends packet forwarding policy 641 to network configuration module 821.

In one embodiment, network configuration module 821 connects to network node 564 and detects a change to network node 564, and in response, network configuration module 821 generates packet forwarding policy 641.

In one embodiment, network configuration module 821 connects to virtual service network 510 and data network 500. Network configuration module 821 detects a change to virtual service network 510 or data network 500. In response, network configuration module 821 generates packet forwarding policy 641.

In one embodiment, network configuration module 821 detects a change in network node 562 and generates packet forwarding policy 641.

In one embodiment, network configuration module 821 instructs network node 562 to remove packet forwarding policy 641. In one embodiment, network configuration module 821 detects a change in network node 564, service load balancer 534, data network 500, virtual service network 510, or network node 562 and determines packet forwarding policy 641 is to be removed. In one embodiment, network configuration module 821 removes packet forwarding policy 641 from storage 823.

In one embodiment, network configuration module 821 receives a command from administrator 120 to remove packet forwarding policy 641. In one embodiment, network configuration module 821 receives a command from service load balancer 534 to remove packet forwarding policy 641.

Figure 7:
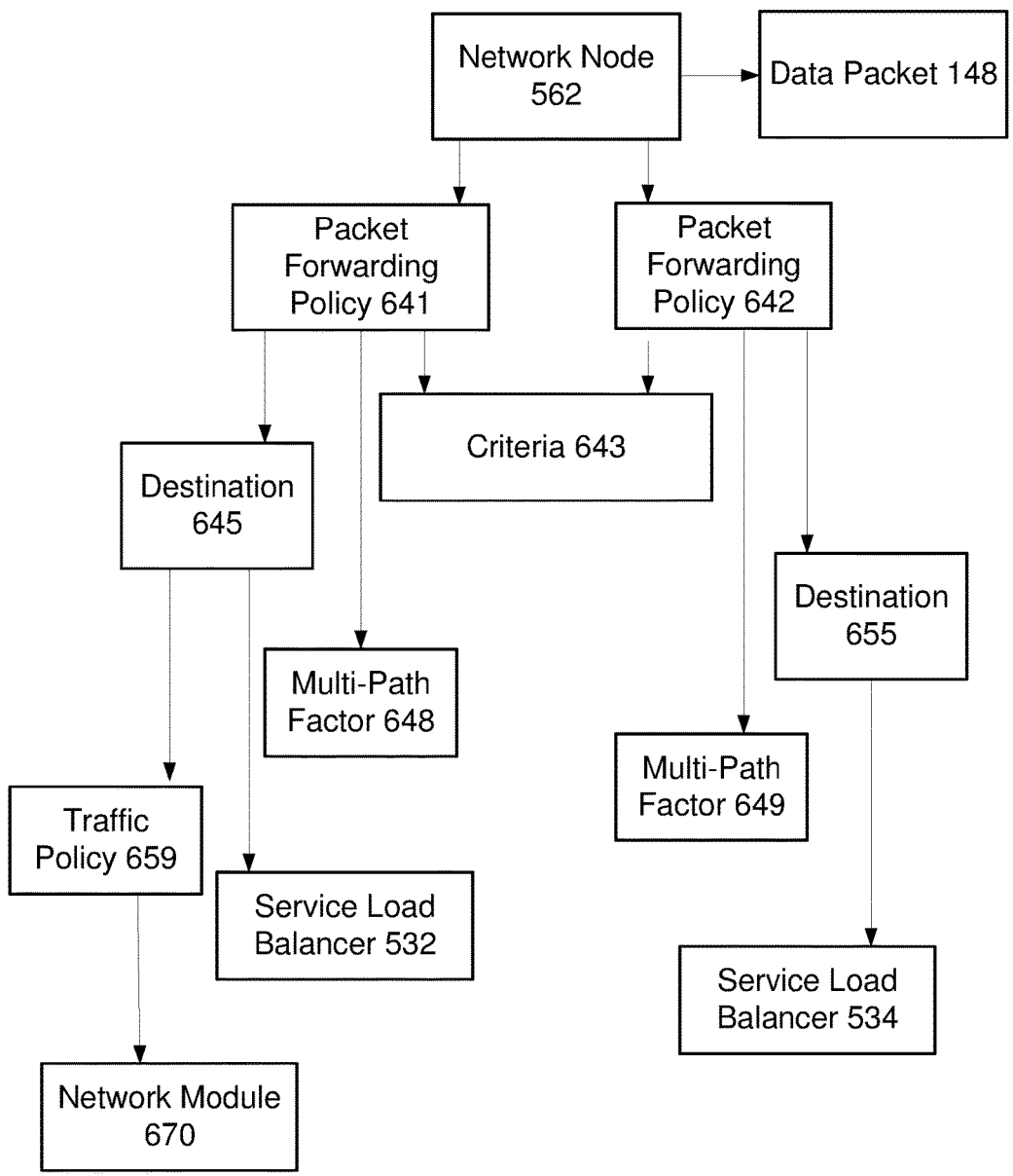
FIG. 7 illustrates packet forwarding policies with other information according to an embodiment of the present invention.

FIG. 7 illustrates several embodiments of different packet forwarding policies according to an embodiment of the present invention. In FIG. 7, network node 562 includes packet forwarding policy 641 and packet forwarding policy 642. Packet forwarding policy 641 and packet forwarding policy 642 include the same criteria 643. Packet forwarding policy 641 includes destination 645 that is different from destination 655 in packet forwarding policy 642. In one embodiment, destination 645 is for service load balancer 532 or a network node (not shown), whereas destination 655 is for service load balancer 534, which is different from service load balancer 532.

In one embodiment, network node 562 receives data packet 148 from client device 100 and matches information in data packet 148 with criteria 643. Network node 562 finds both packet forwarding policy 641 and packet forwarding policy 642 applicable. Network node 562 selects packet forwarding policy 641 based on additional information. In one embodiment, packet forwarding policy 641 includes multi-path factor 648 while packet forwarding policy 642 includes multi-path factor 649. Network node 562 selects packet forwarding policy 641 based on multi-path factor 648 and multi-path factor 649. In one embodiment, multi-path factor 648 indicates a primary path while multi-path factor 649 indicates a secondary path. Network node 562 selects packet forwarding policy 641. In one embodiment, multi-path factor 648 includes a status indicating if service load balancer 532 is available. If multi-path factor 648 status indicates service load balancer 532 is available and multi-path factor 649 status indicates service load balancer 534 is not available, network node 562 selects packet forwarding policy 641.

In one embodiment, packet forwarding policy 641 includes traffic policy 659 such as traffic shaping, traffic management, quality of service, bandwidth management, packet access control or queuing parameters. Network node 562 applies traffic policy 659 or instructs network module 670 to apply traffic policy 659.

Figure 8:
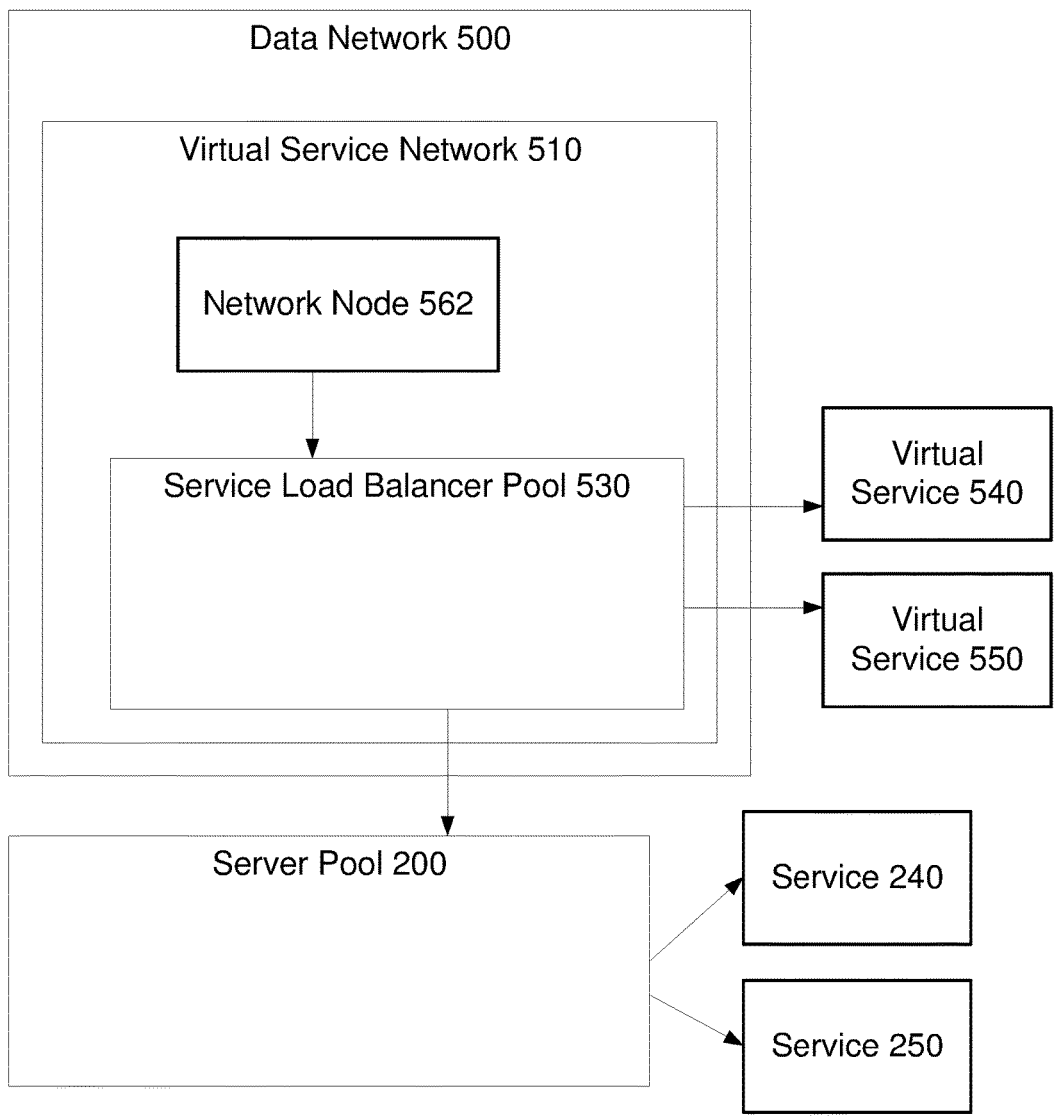
FIG. 8 illustrates a virtual service network supporting multiple services according to an embodiment of the present invention.

In an embodiment illustrated in FIG. 8, server pool 200 serves service 240 and service 250. In this embodiment, service load balancer pool 530 provides virtual services 540 and 550 corresponding to service 240 and service 250 respectively. Network node 562 will include at least one packet forwarding policy for virtual service 540 and one packet forwarding policy for virtual service 550. When the network node 562 receives a data packet, the network node 562 determines whether the data packet is for virtual service 540 or virtual service 550. If the data packet is for virtual service 540, then the network node 562 processes the data packet according to the packet forwarding policies for virtual service 540. If the data packet is for virtual service 550, then the network node 562 processes the data packet according to the packet forwarding policies for virtual service 550.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing a client service session of a network service and forwarding the client service session to a pool of service load balancers using at least one packet forwarding policy in a virtual service network, the virtual service network comprising at least one network node and the pool of service load balancers serving a virtual service associated with a virtual service network address, comprising:

receiving a virtual service session request from a client device by the at least one network node, the virtual service session request comprising the virtual service network address for the virtual service served by the pool of service load balancers and a client device network address;

selecting a service load balancer based on the at least one packet forwarding policy by the at least one network node, wherein the selecting comprises:

determining whether a first packet forwarding policy or a second packet forwarding policy is applied to the virtual service session request, wherein a client network address of the first packet forwarding policy is different from a client network address of the second packet forwarding policy, the determining comprising:

comparing the client network address and a virtual service network address of the second packet forwarding policy with the client device network address and the virtual service network address of the virtual service session request;

in response to not finding a match between the client network address of the second packet forwarding policy and the client device network address, comparing the client network address and a virtual service network address of the first packet forwarding policy with the client device network address and the virtual service network address of the virtual service session request; and in response to finding a match between the client network address and the virtual service network address of the first packet forwarding policy with the client device network address and the virtual service network address of the virtual service session request, applying the first packet forwarding policy to the virtual service session request;

sending the virtual service session request to a selected service load balancer by the at least one network node;

establishing a virtual service session with the client device by the selected service load balancer;

sending a virtual service request through the established virtual service session to the selected service load balancer by the client device; and sending a virtual service data packet from the client device to a server by the selected service load balancer.

2. The method of claim 1, wherein the criteria to match against the virtual service session request comprise at least one of a virtual service network address, a transport layer address, a client network address, a range of virtual service network addresses, a range of transport layer addresses, and a range of client network addresses.

3. The method of claim 1, wherein the selecting comprises:

comparing, by the network node, criteria of the at least one packet forwarding policy against the virtual service session request; and in response to finding a match between criteria of the at least one packet forwarding policy and the virtual service session request, applying the packet forwarding policy to the virtual service session request.

4. The method of claim 1, wherein after the client device sends the virtual service request to the service load balancer, the method further comprises:
selecting the server to service the virtual service request;
sending the service load balancer a service request response to the virtual service request by the server; and
creating and sending a virtual service request response to the client device by the service load balancer.

5. The method of claim 1, wherein the virtual service network comprises a first network node connected with a second network node and the service load balancer, wherein the first network node selects the second network node to receive and process the virtual service data packet from the first network node.

6. The method of claim 1, further comprising a network configuration module for configuring the at least one network node with at least one packet forwarding policy, wherein the network configuration module:
connects to the selected service load balancer;
detects a change to the selected service load balancer; and
in response to detecting a change to the service load balancer, generates at least one packet forwarding policy.

7. The method of claim 6, the method further comprising:
detecting a change in at least one of the network node, the selected service load balancer, the data network, and the virtual service network; and
determining the at least one packet forwarding policy is to be removed.

8. The method of claim 1, wherein the selecting comprises:
determining whether a first packet forwarding policy or a second packet forwarding policy is applied to the virtual service session request, wherein criteria of the first packet forwarding policy is the same as criteria of the second packet forwarding policy, the determining comprising:
selecting the first packet forwarding policy or the second packet forwarding policy based on additional information.

9. The method of claim 8, wherein the additional information comprises at least one of a multi-path factor and a traffic policy.

10. The method of claim 9, wherein a multi-path factor of the first packet forwarding policy indicates a primary path and a multi-path factor of the second forwarding policy indicates a secondary path.

11. A non-transitory computer readable storage medium having computer readable program code embodied therewith for processing a client service session of a network service and forwarding the client service session to a pool of service load balancers using at least one packet forwarding policy in a virtual service network, the virtual service network comprising at least one network node and the pool of service load balancers serving a virtual service associated with a virtual service network address, the computer readable program code configured to:
receive a virtual service session request from a client device by the at least one network node, the virtual service session request comprising the virtual service network address for the virtual service served by the pool of service load balancers and a client device network address;
select a service load balancer based on the at least one packet forwarding policy by the at least one network node, wherein the computer readable program code configured to select is further configured to:
determine whether a first packet forwarding policy or a second packet forwarding policy is applied to the virtual service session request, wherein a client network address of the first packet forwarding policy is different from a client network address of the second packet forwarding policy, the determine comprising:
compare the client network address and a virtual service network address of the second packet forwarding policy with the client device network address and the virtual service network address of the virtual service session request;
in response to not finding a match between the client network address of the second packet forwarding policy and the client device network address, compare the client network address and a virtual service network address of the first packet forwarding policy with the client device network address and the virtual service network address of the virtual service session request; and
in response to finding a match between the client network address and the virtual service network address of the first packet forwarding policy with the client device network address and the virtual service network address of the virtual service session request, apply the first packet forwarding policy to the virtual service session request;
send the virtual service session request to a selected service load balancer by the at least one network node;
establish a virtual service session with the client device by the selected service load balancer;
send a virtual service request through the established virtual service session to the selected service load balancer by the client device; and
send a virtual service data packet from the client device to a server by the selected service load balancer.

12. The medium of claim 11, wherein the criteria to match against the virtual service session request comprise at least one of a virtual service network address, a transport layer address, a client network address, a range of virtual service network addresses, a range of transport layer addresses, and a range of client network addresses.

13. The medium of claim 11, wherein the computer readable program code configured to select is further configured to:
compare, by the network node, criteria of the at least one packet forwarding policy against the virtual service session request; and
in response to finding a match between criteria of the at least one packet forwarding policy and the virtual service session request, apply the packet forwarding policy to the virtual service session request.

14. The medium of claim 11, further comprising a network configuration module for configuring the at least one network node with at least one packet forwarding policy, wherein the network configuration module is configured to:
connect to the selected service load balancer;
detect a change to the selected service load balancer; and
in response to detecting a change to the selected service load balancer, generate at least one packet forwarding policy.

15. The medium of claim 14, wherein the computer readable program code is further configured to:

detect a change in at least one of the network node, the selected service load balancer, the data network, and the virtual service network; and determine the at least one packet forwarding policy is to be removed.

16. The medium of claim 11, wherein the computer readable program code configured to select is further configured to:

determine whether a first packet forwarding policy or a second packet forwarding policy is applied to the virtual service session request, wherein criteria of the first packet forwarding policy is the same as criteria of the second packet forwarding policy, the determine comprising:

select the first packet forwarding policy or the second packet forwarding policy based on additional information.

17. The medium of claim 16, wherein the additional information comprises at least one of a multi-path factor and a traffic policy.

18. The medium of claim 17, wherein a multi-path factor of the first packet forwarding policy indicates a primary path and a multi-path factor of the second forwarding policy indicates a secondary path.

* * * * *